US008086995B2

(12) United States Patent
Luo et al.

(10) Patent No.: US 8,086,995 B2
(45) Date of Patent: Dec. 27, 2011

(54) SYSTEM AND METHOD FOR FLEXIBLE VISUAL REPRESENTATION OF DEVICE FONTS

(75) Inventors: Zhong Hai Luo, Toronto (CA); Bryan Goring, Milton (CA); David Debruin, Guelph (CA); Michael Shenfield, Richmond Hill (CA)

(73) Assignee: Research In Motion Limited, Waterloo, Ontario (CA)

( * ) Notice: Subject to any disclaimer, the term of this patent is extended or adjusted under 35 U.S.C. 154(b) by 1324 days.

(21) Appl. No.: 11/287,355

(22) Filed: Nov. 28, 2005

(65) Prior Publication Data

US 2006/0248506 A1 Nov. 2, 2006

Related U.S. Application Data

(60) Provisional application No. 60/672,017, filed on Apr. 18, 2005.

(51) Int. Cl.
*G06F 9/44* (2006.01)
(52) U.S. Cl. .......................... 717/105; 717/109
(58) Field of Classification Search .................. None
See application file for complete search history.

(56) References Cited

U.S. PATENT DOCUMENTS

| 6,823,495 | B1 | 11/2004 | Vedula et al. |
| 7,222,306 | B2* | 5/2007 | Kaasila et al. ................ 715/801 |
| 7,287,220 | B2* | 10/2007 | Kaasila et al. ................ 715/201 |
| 7,512,402 | B2* | 3/2009 | Narayanaswami et al. ... 455/420 |
| 2002/0133635 | A1 | 9/2002 | Schechter et al. |
| 2003/0009747 | A1 | 1/2003 | Duran |
| 2003/0184557 | A1 | 10/2003 | Wen |
| 2004/0157593 | A1 | 8/2004 | Lee et al. |
| 2004/0177335 | A1 | 9/2004 | Beisiegel et al. |
| 2005/0062758 | A1* | 3/2005 | Kaasila et al. ................ 345/613 |
| 2005/0125211 | A1* | 6/2005 | Nahata et al. ................ 703/13 |
| 2005/0151740 | A1* | 7/2005 | Salesin et al. ................ 345/471 |
| 2005/0190187 | A1* | 9/2005 | Salesin et al. ................ 345/471 |
| 2005/0289479 | A1* | 12/2005 | Yoshida et al. ................ 715/816 |
| 2006/0174217 | A1* | 8/2006 | Yan et al. ................ 715/866 |

FOREIGN PATENT DOCUMENTS

| EP | 0621557 | 10/1994 |
| JP | 07 084800 | 3/1995 |
| JP | 2002083279 | 3/2002 |

OTHER PUBLICATIONS

Mori et al., "Design and Development of Mutidevice User Interfaces through Multiple Logical Descriptions", Aug. 2004, IEEE, vol. 30, No. 8, pp. 507-520.*

(Continued)

*Primary Examiner* — Tuan Dam
*Assistant Examiner* — Ben Wang

(57) ABSTRACT

A system and method for developing an application for execution on a target device is described. The system comprises: a processor and a memory for storing instructions and data to configure the processor to provide: a development platform interface for developing a presentation component for output by the target device to a user interface in accordance with a target device appearance definition; a plurality of development platform appearance definitions for configuring the appearance of output of the development platform interface; and a mapping mechanism for mapping between the target device appearance definition and a corresponding development platform appearance definition to simulate on the system the output of the presentation component by the target device.

14 Claims, 11 Drawing Sheets

OTHER PUBLICATIONS

Erik G. Nilson, "Combining Compund Conceptual User Interface Components with Modelling Patterns—A Promising Direction for Model-Based Cross-Platform User Interface Development", 2002, Springer-Verlag Berlin Heidelberg, pp. 104-117.*

Thomas Künneth, "Low-Level Display Access in MIDlets", Feb. 2, 2005, Java.net <http://www.java.net>, pp. 1-8.*

Michael Powers, "MIDP Terminal Emulation, Part 1: A Simple Emulator MIDlet", Jan. 2004, Sun Microsystems, Inc., pp. 1-31.*

Michael Powers, "MIDP Terminal Emulation, Part 2: Advanced Terminal Emulation", Apr. 2004, Sun Microsystems, Inc., pp. 1-10.*

Michael Powers, "MIDP Terminal Emulation, Part3: Custom Fonts for MIDP", Jun. 2004, Sun Microsystems, Inc., pp. 1-8.*

Sun MicroSystems: J2ME Wireless Toolkit Basic Customization Guide. Internet article (online) Oct. 2004, XP002477930 http://www.cs.utah.edu.classes/cs5520/java/J2ME/WIK22/docs/Basic-CustomizationGuide.pdf> [retrieved on Apr. 22, 2008].

Knudsen J: What's new in the H2ME Wireless Toolkit 2.2. Internet article (online) Jun. 2004, XP002477931 http://developers.sun.com/mobility/midp/articles/wtoolkit2_2/> [retrieved on Apr. 22, 2008].

Xiulan Yu et al: "WSCE: a flexible web service composition environment" Web Services, 2004. Proceedings. IEEE International Conference on San Diego, CA, USA Jul. 6-9, 2004, Piscataway, NJ, USA, IEEE, Jul. 6, 2004, pp. 428-435, XP010708875 ISBN: 0-7695-2167-3 *the whole document*.

Tatsubori M et al: "Best-practice patterns and tool support for configuring secure web services messaging" Web Services, 2004. Proceedings. IEEE International Conference on San Diego, CA, USA Jul. 6-9, 2004, Piscataway, NJ, USA, IEEE, Jul. 6, 2004, pp. 244-251, XP010708861 ISBN: 0-7695-2167-3 *the whole document*.

Dan Marinescu, Canadian Intellectual Property Office Communication dated Jun. 8, 2010 in relation to Application No. 2,604,449 filed Oct. 10, 2007.

* cited by examiner

SYSTEM AND METHOD FOR FLEXIBLE VISUAL REPRESENTATION OF DEVICE FONTS

RELATED APPLICATION INFORMATION

This application claims priority from U.S. Provisional Patent Application No. 60/672,017, filed Apr. 18, 2005.

FIELD OF THE APPLICATION

This application relates generally to the development of software applications and particularly to component-based applications.

BACKGROUND

There are a continually increasing number of terminals and mobile devices in use today, such as smart phones, Personal Digital Assistants (PDAs) with wireless communication capabilities, personal computers, self-service kiosks and two-way pagers/communication devices. Software applications which run on these devices increase their utility. For example, a smart phone may include an application which retrieves the weather for a range of cities, or a PDA may include an application that allows a user to shop for groceries. These software applications take advantage of the connectivity to a network in order to provide timely and useful services to users. However, due to the restricted resources of some devices, and the complexity of delivering large amounts of data to the devices, developing and maintaining software applications tailored for a variety of devices remains a difficult and time-consuming task.

Mobile communication devices are primarily configured to communicate with Web-based applications, such as service-oriented applications, through Web browsers and/or native applications. Browsers have the advantage of being adaptable to operate on a cross-platform basis for a variety of different devices, but have a disadvantage of requesting pages (screen definitions in HTML) from the application, which hinders the persistence of data contained in the screens. A further disadvantage of browsers is that the screens are rendered at runtime, which can be resource intensive. Native applications have the advantage of being developed specifically for the type of mobile device, thereby providing a relatively optimized application program for each runtime environment. However, native applications have a disadvantage of not being platform independent, thereby necessitating the development of multiple versions of the same application, as well as being relatively large in size, thereby taxing the memory resources of the mobile device. Further, application developers need experience with programming languages such as Java™ and C++ to construct these hard-coded native applications. There is a need for application development environments that can assist in the development of applications for selected devices and terminals with their respective runtime environment, as well as being capable of assisting the selection from a variety of back-end data sources.

Developing applications on a development platform (e.g. an application development environment executing on one computer) for execution on one or more other target platforms (e.g. various wireless devices) often requires that the development platform be capable of simulating one or more aspects of the target platform. For example, when defining a visual interface for the application, it is desired to be able to render the visual interface on the development platform as it would appear on the target platform. However, in some cases the visual interface may only be approximated by the development platform.

A need therefore exists for improved systems and methods for providing a component-based application development environment that obviate or mitigate at least some of the above-noted disadvantages.

BRIEF DESCRIPTION OF THE DRAWINGS

It will be noted that throughout the appended drawings, like features are identified by like reference numerals.

DETAILED DESCRIPTION OF THE PREFERRED EMBODIMENTS

Figure 1:
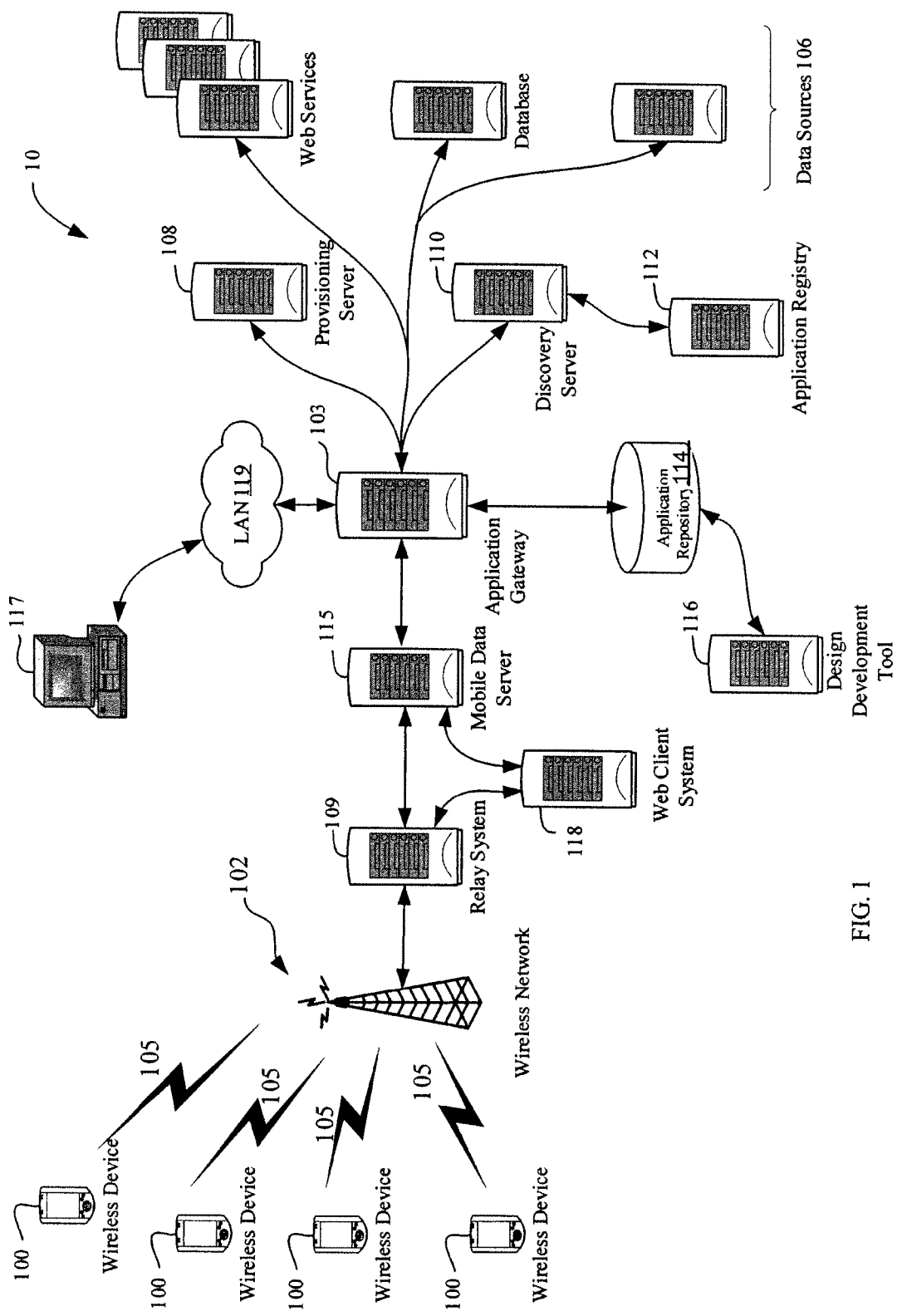
FIG. 1 is a block diagram of a communication network system.

The following detailed description of the embodiments of the present application does not limit the implementation of the application to any particular computer programming language. The present application may be implemented in any computer programming language provided that the operating system (OS) provides the facilities that may support the requirements of the present application. An embodiment is implemented in the Java™ computer programming language (or other computer programming languages such as C or C++). Java and all Java-based trademarks are the trademarks of Sun Microsystems Corporation.) Any limitations presented would be a result of a particular type of operating system or computer programming language and would not be a limitation of the present application.

An application generation environment (e.g. an integrated design environment (IDE) tool) coordinates development of applications, particularly component-based applications on a development platform for execution on a target platform. Components for specifying user interface aspects of the application, particularly display screen aspects, may be developed using development-platform appearance definitions (e.g. fonts, font sizes and effects) which approximate target-platform appearance definitions in accordance with a mapping mechanism.

In one embodiment, the application generation environment (e.g. an IDE tool) on a development platform coordinates development of component-based applications using an interconnected model of objects serialized in a first format of a structured definition language (e.g. XML). Application components are generated for execution on a client device (e.g. a wireless mobile device) comprising a runtime environment and a supporting stateful proxy gateway and primarily define the processing of messages communicated over a network between the client device and an external data source such as a service or other remote end-point via the gateway. User interface components for specifying screens to be displayed on the client device are developed within the application generation environment using development platform appearance definitions which are mapped to client device appearance definitions to simulate the appearance of the user interface. A mapping mechanism associates respective client device appearance definitions and development platform appearance definitions. For example, in one embodiment, during development the user interface component may be defined (for example using XML) with reference to the client device appearance definitions and mapped for display on the development platform using the mapping mechanism. In another embodiment, during development the user interface component may be defined with reference the development platform appearance definitions and mapped using the mapping mechanism to reference the client device appearance definitions when expressing the user component definition for execution on the client device.

According to one aspect of the application, there is provided a system for developing an application for execution on a target device, the system comprising: a processor and a memory for storing instructions and data to configure the processor to provide: a development platform interface for developing a presentation component for output by the target device to a user interface in accordance with a target device appearance definition; a plurality of development platform appearance definitions for configuring the appearance of output of the development platform interface; and a mapping mechanism for mapping between the target device appearance definition and a corresponding development platform appearance definition to simulate on the system the output of the presentation component by the target device.

Preferably, the development platform interface is configured to define the presentation component to include references to the target device appearance definition and the mapping mechanism maps the references to the corresponding development appearance definition to simulate the output of the presentation component.

Preferably, the target device appearance definitions and development device appearance definitions comprise any of font, font size, and font effects.

Preferably, the system comprises an integrated development environment tool platform.

Preferably, the system further comprises a serialization module for expressing a definition of the presentation component for deployment to the target device, the definition of the presentation component comprising references to the target device appearance definition.

According to another aspect of the application, there is provided a method for developing an application for execution on a target device, the method comprising: defining a presentation component on a development platform, the presentation component for output by the target device to a user interface in accordance with a target device appearance definition; mapping between the target device appearance definition and a development platform appearance definition which approximates the target device appearance definition; and simulating an output of the presentation component on the development platform using the development platform appearance definition.

Preferably, the method further comprises expressing a definition of the presentation component for deployment to the target device, the definition of the presentation component comprising references to the target device appearance definition.

Preferably, the target device comprises a wireless device and the presentation component defines a screen output for the user interface of the wireless device.

In accordance with further aspects of the present application, there is provided articles of manufacture such as a machine or computer readable medium having program instructions recorded thereon for practising the method of the application, as well as a computer data signal having program instructions recorded therein for practising the method of the application.

Network System

Referring to FIG. 1, a network system 10 comprises mobile communication devices 100 for interacting with one or more backend data sources 106 (e.g. a schema-based service such as Web service or database that provides enterprise applications and services used by an application 105) via a wireless network 102 coupled to an application gateway (AG) 103. The devices 100 are devices such as, but not limited to, mobile telephones, PDAs, two-way pagers, dual-mode communication devices. The network 10 can also have desktop computers 117 coupled though a local area network (LAN) 119. The devices 100 and desktop computers 117 of the network 10 are hereafter referred to as the devices 100 for the sake of simplicity. It is recognised that the application gateway 103 and data sources 106 can be linked via extranets (e.g. the Internet) and/or intranets. The application gateway 103 handles request/response messages initiated by the application 105 as well as subscription notifications pushed to the device 100 from the data sources 106. The application gateway 103 can function as a Data Mapping Server for mediating messaging between a client runtime environment (RE) on the device 100 and a backend server of the data sources 106. The runtime environment is an intelligent container that executes application 105 components and provides common services as needed for execution of the applications 105. The application gateway 103 can provide for asynchronous messaging for the applications 105 and can integrate and communicate with legacy back-end data sources 106. The devices 100 transmit and receive the wireless component applications technology or wireless component applications 105, as further described below, when in communication with the data sources 106, as well as transmit/receive messaging associated with operation of the applications 105. The devices 100 can operate as Web clients of the data sources 106 through execution of the applications 105 when provisioned on respective runtime environments of the devices 100.

For satisfying the appropriate messaging associated with the applications 105, the application gateway 103 communicates with the data sources 106 through various protocols (such as, but not limited to, hyper text transfer protocol (HTTP), structured query language (SQL), and component application program interface (API)) for exposing relevant business logic (methods) to the applications 105 once provisioned on the devices 100. The applications 105 can use the business logic of the data sources 106 similar to calling a method on an object (or a function). It is recognized that the applications 105 can be downloaded/uploaded in relation to data sources 106 via the network 102 and application gateway 103 directly to the devices 100. For example, the application gateway 103 is coupled to a provisioning server 108 and a discovery server 110 for providing a mechanism for optimized over-the-air provisioning of the applications 105, including capabilities for application 105 discovery from the device 100 as listed in an application registry 112 such as, for example, a universal description discovery and integration (UDDI) registry. The registry 112 can be part of the discovery service implemented by the server 110, and the registry 112 is used for publishing the applications 105. The application 105 information in the registry 112 can contain such as, but not limited to, a deployment descriptor (DD) (contains information such as application 105 name, version, and description) as well as the location of this application 105 in an application repository 114.

Referring again to FIG. 1, for initialization of the runtime environment, the runtime environment receives the application gateway 103 universal resource locator (URL) and the gateway public key in a mobile data system or server (MDS) 115 service book. The runtime environment uses this information to connect to the application gateway 103 for initial handshaking. The mobile data system 115 or Web client system 118, depending on the domain, pushes the mobile data server 115 service book to the device 100 via a relay system 109. It is recognised there could be more than one application gateway 103 in the network 10, as desired. Once initialized, access to the applications 105 by the devices 100, as downloaded/uploaded, can be communicated via the application gateway 103 directly from the application repository 114, and/or in association with data source 106 direct access (not shown) to the repository 114.

Application Design User Interface or Design Development Tool 116

Referring to FIG. 1, the applications 105 can be stored in the repository 114 as a series of packages that can be created by a design development tool 116, which is employed by developers of the applications 105. The design development tool 116 can be a Rapid Application Development (RAD) tool used to develop the wired and/or wireless component application 105 packages. The design development tool 116 can provide support for a drag- and drop graphical approach for the visual design of application 105 components (see FIG. 4) such as, but not limited to, screens 402, data elements 400, messages 404 and application workflow logic 406, as further defined below. The application 105 packages are represented as metadata (e.g. eXxtensible Markup Language (XML)) that can be generated automatically by the design development tool 116 through an automatic code generation process. The design development tool 116 can provide for the automatic generated code to include or be otherwise augmented by an industry-standard scripting language (e.g. JavaScript) or other scripting/programming languages. The availability of the application 105 packages of the repository 114 is published via the discovery service of the server 110 in the registry 112. It is recognized that there can be more than one repository 114 and associated registries 112 as utilized by the particular network 10 configuration of the application gateway 103 and associated data sources 106.

Figure 2:
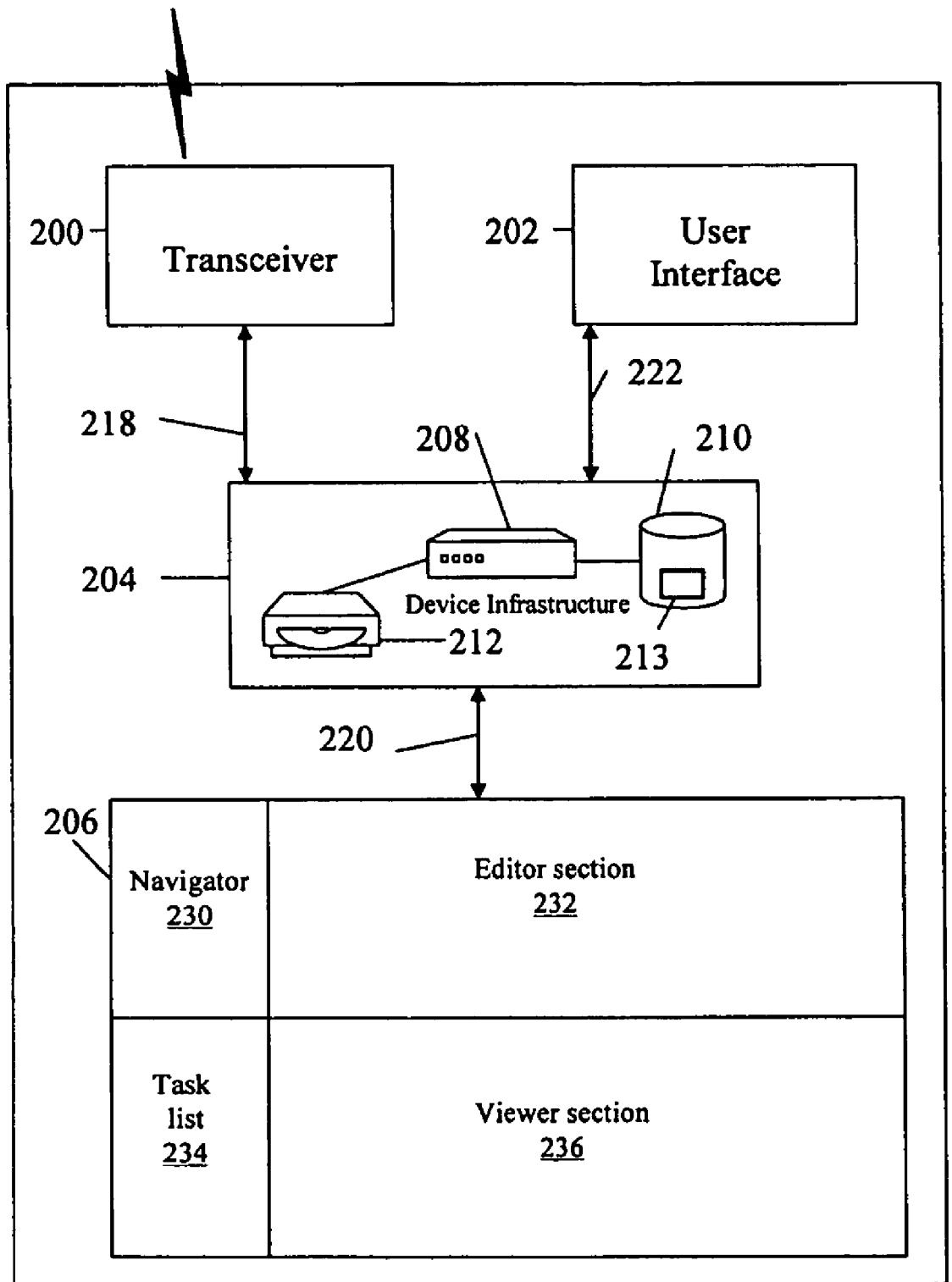
FIG. 2 is a block diagram of a tool for developing and generating the applications of FIG. 1.

Referring to FIG. 2, the design development tool 116 is operated on a computer 201 (i.e. a development platform) that can be connected to the network 10 via a network connection interface such as a transceiver 200 coupled via connection 218 to a device infrastructure 204. The transceiver 200 can be used to upload completed application programs 105 to the repository 114 (see FIG. 1), as well as access the registry 112 and selected data sources 106. Referring again to FIG. 2, the design development tool 116 also has a user interface 202, coupled to the device infrastructure 204 by connection 222, to interact with a user (not shown). The user interface 202 includes one or more user input devices such as, but not limited to, a keyboard, a keypad, a trackwheel, a stylus, a mouse, a microphone, and is coupled to a user output device such as a speaker (not shown) and a screen display 206. If the display 206 is touch sensitive, then the display 206 can also be used as the user input device as controlled by the device infrastructure 204. The user interface 202 is employed by the user of the design development tool 116 to coordinate the design of applications 105 using a series of editors 600 and viewers 602 (see FIG. 6), using a plurality of wizards 604 to assist in the workflow of the development process.

Referring again to FIG. 2, operation of the tool computer 201 is enabled by the device infrastructure 204. The device infrastructure 204 includes a computer processor 208 and the associated memory module 210. The computer processor 208 manipulates the operation of the network interface 200, the user interface 202 and the display 206 of the design development tool 116 by executing related instructions, which are provided by an operating system and application 105 design editors 600, wizards 604, dialogs 605 and viewers 602 resident in the memory module 210. Further, it is recognized that the device infrastructure 204 can include a computer readable storage medium 212 coupled to the processor 208 for providing instructions to the processor 208 and/or to load/design the applications 105 also resident (for example) in the memory module 210. One aspect of the device infrastructure 204 typically includes appearance definitions 213 for fonts, font sizes, and effects or styles, etc. to permit a user or application to configure the appearance of text and other visual elements on output devices such as user interface 202. These definitions 213 may further permit the configuration of other outputs such as printed output or application artifacts such as word processing documents, HTML-based email, etc. and for illustrative purposes are shown as stored in memory module 210. Appearance definitions 213 provided by device infrastructure 204 are typically made available to any application while executing on the computer 201. Additional appearance definitions (not shown) may be provided by a particular application (e.g. the design development tool 116) typically for its use only and persons of ordinary skill in the art will appreciate that such appearance definitions may be used within the scope of the teachings herein. Reference hereinafter will be made to development platform appearance definitions which may include appearance definitions 213 and any other appearance definitions available to design development tool 116 for configuring the appearance of output on tool computer 201. As the design development tool 116 may be used to develop applications for a wide variety of target devices (e.g. 100, 117), the development platform application definitions may not have exact equivalents to target device application definitions (FIG. 6, 630) used to configure the appearance of output (e.g. a device screen for display on a display device of the target device). As described further below, a mapping mechanism may be useful to simulate the appearance of a target device's user interface on the user interface 202 of tool computer 201.

The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, the design development tool 116 is operated on the computer 201 as an application development environment for developing the applications 105. The development methodology of the design development tool 116 can be based on a visual "drag and drop" system of building the application visual, data, messaging behaviour, and runtime navigation model. The design development tool 116 can be structured as a set of plug-ins to a generic integrated design environment (IDE) framework such as, but not limited to, the ECLIPSE™ universal tool platform from eclipse.org, or the design development tool 116 can be configured as a complete design framework without using plug-in architecture. For exemplary purposes only, the design development tool 116 will now be described as a plug-in design environment using the ECLIPSE™ framework.

Figure 6:
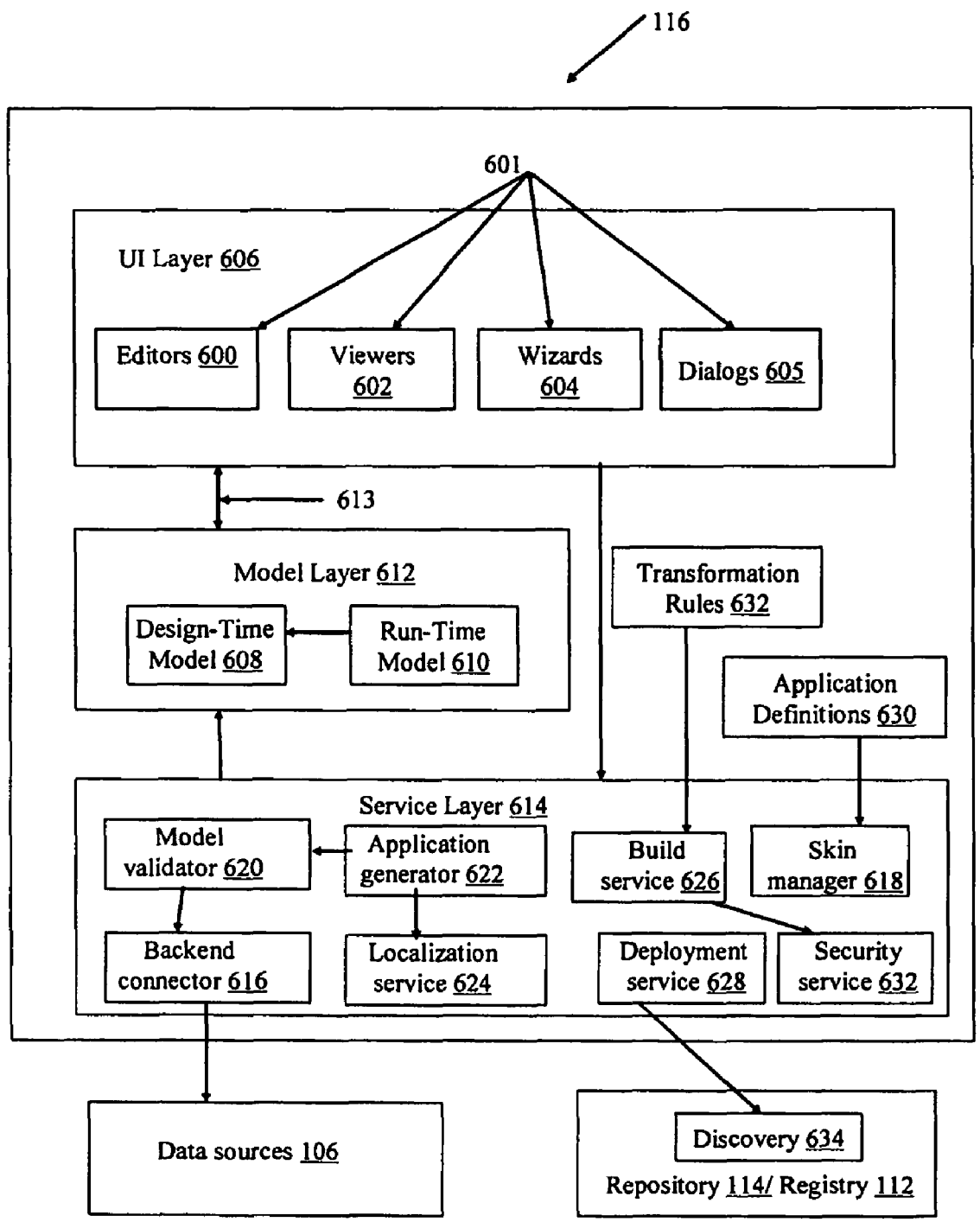
FIG. 6 is a block diagram of the tool architecture of FIG. 2.

Referring to FIGS. 2 and 6, ECLIPSE™ makes provisions for a basic, generic design development tool 116 environment that can be extended to provide custom editors, wizards, project management and a host of other functionality. The ECLIPSE™ platform is designed for building IDEs that can be used to create applications as diverse as Web sites, embedded Java™ programs, C++ programs, and Enterprise JavaBeans™. The navigator view 230 shows files in a user's (e.g. developer) workspace; a text editor section 232 shows the content of a file being worked on by the user of the design development tool 116 to develop the application 105 and associated components 400, 402, 404, 406 (see FIG. 4) in question; the tasks view section 234 shows a list of to-dos for the user of the design development tool 116; and the outline viewer section 236 shows for example a content outline of the application 105 being designed/edited, and/or may augment other views by providing information about the currently selected object such as properties of the object selected in another view. It is recognised that the design development tool 116 aids the developer in creating and modifying the coded definition content of the components 400, 402, 404 in the structured definition language (e.g. in XML). Further, the design development tool 116 also aids the developer in creating, modifying, and validating the interdependencies of the definition content between the components 400, 402, 404 such as, but not limited to, message/data and screen/data relationships. It is also recognised that presentation on the display of wizard 604 and dialog 605 content for use by the developer (during use of the editors 600 and viewers 602) can be positioned in one of the sections 230, 232, 234, 236 and/or in a dedicated wizard section (not shown), as desired.

The ECLIPSE™ Platform is built on a mechanism for discovering, integrating, and running modules called plug-ins (i.e. editors 600 and viewers 602). When the ECLIPSE™ Platform is launched via the UI 202 of the computer 201, the user is presented with an integrated development environment (IDE) on the display 206 composed of the set of available plug-ins, such as editors 600 and viewers 602. The various plug-ins to the ECLIPSE™ Platform operate on regular files in the user's workspace indicated on the display 206. The workspace consists of one or more top-level projects, where each project maps to a corresponding user-specified directory in the file system, as stored in the memory 210 (and/or accessible on the network 10), which is navigated using the navigator 230. The ECLIPSE™ Platform UI paradigm is based on editors, views, and perspectives. From the user's standpoint, a workbench display 206 consists visually of views 602 and editors 600. Perspectives manifest themselves in the selection and arrangements of editors 600 and views 602 visible on the display 206. Editors 600 allow the user to open, edit, and save objects. The editors 600 follow an open-save-close lifecycle much like file system based tools. When active, a selected editor 600 can contribute actions to a workbench menu and tool bar. Views 602 provide information about some object that the user is working with in the workbench. A viewer 602 may assist the editor 600 by providing information about the document being edited. For example, viewers 602 can have a simpler lifecycle than editors 600, whereby modifications made in using a viewer 602 (such as changing a property value) are generally saved immediately, and the changes are reflected immediately in other related parts of the display 206. It is also recognised that a workbench window of the display 206 can have several separate perspectives, only one of which is visible at any given moment. Each perspective has its own viewers 602 and editors 600 that are arranged (tiled, stacked, or detached) for presentation on the display 206.

Component Applications 105

Figure 3:
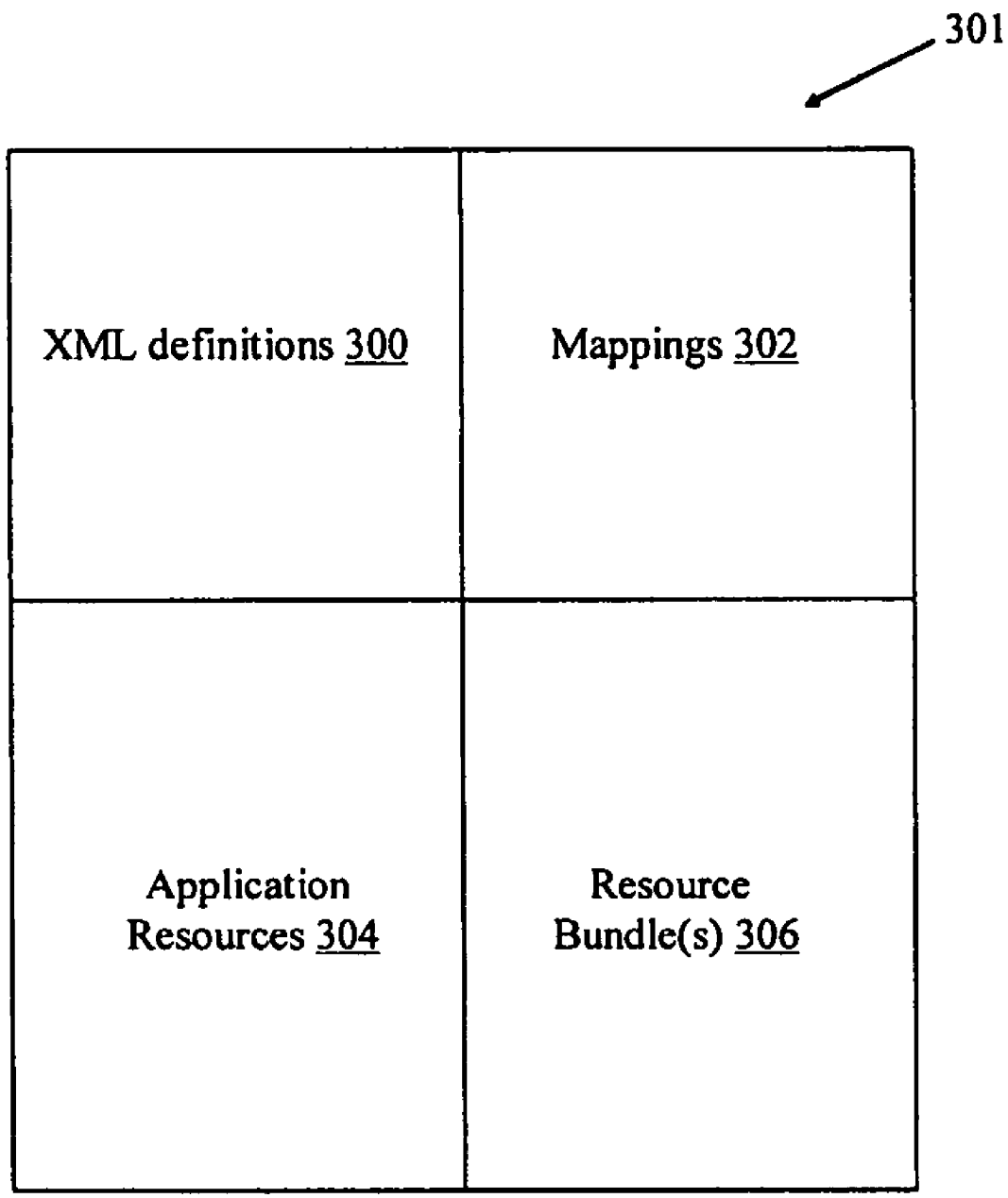
FIG. 3 is a block diagram of a component application package of FIG. 1.

Referring to FIG. 3, the application 105 packages have application elements or artifacts 301 such as, but not limited to, XML definitions 300, mappings 302, application resources 304, and optionally resource bundle(s) 306 for localization support. XML definitions 300 are XML coding of application data 400, messages 404, screens 402 components and workflow 406, part of the raw application 105. It is recognised that XML syntax is used only as an example of any structured definition language applicable to coding of the applications 105. Application mapping 302 defines the relationship of content in the application messaging to backend operation of the data sources 106. The application developer creates the mappings 302 using the design development tool 116, whereby the application gateway 103 utilizes this mapping 302 information during communication of the application 105 request/response messages between the runtime environment of the devices 100 and the data sources 106. The resources 304 are one or more resources (images, sound bites, video clips, or other media) that are packaged with the application 105 as static dependencies. For example, resources 304 can be located relative to a resources folder (not shown) such that a particular resource may contain its own relative path to the main folder (e.g. resources/icon.gif, resources/screens/clipart_1.0/happyface.gif, and resources/sound_bites/midi/inthemood.midi). The resource bundles 306 can contain localization information for each language supported by the application 105. These bundles can be located in a locale folder, for example, and can be named according to the language supported (e.g. locale/lang_en.properties and locale/lang_fr.properties). Examples of the elements 301 are given below.

It is recognised that the runtime environment of the device 100 is the client-resident container within which the applications 105 are executed on the device 100. The container manages the application 105 lifecycle on the device 100 (provisioning, execution, deletion, etc.) and is responsible for translating the metadata (XML) representing the application 105 into an efficient executable form on the device 100. The application 105 metadata is the executable form of the XML definitions 300, as described above, and is created and maintained by the runtime environment. The runtime environment can provide a set of common services to the application 105, as well as providing support for optional JavaScript or other scripting languages. These services include support for such as, but not limited to, UI control, data persistence and asynchronous client-server messaging. It is recognised that these services could also be incorporated as part of the application 105, if desired.

Figure 4:
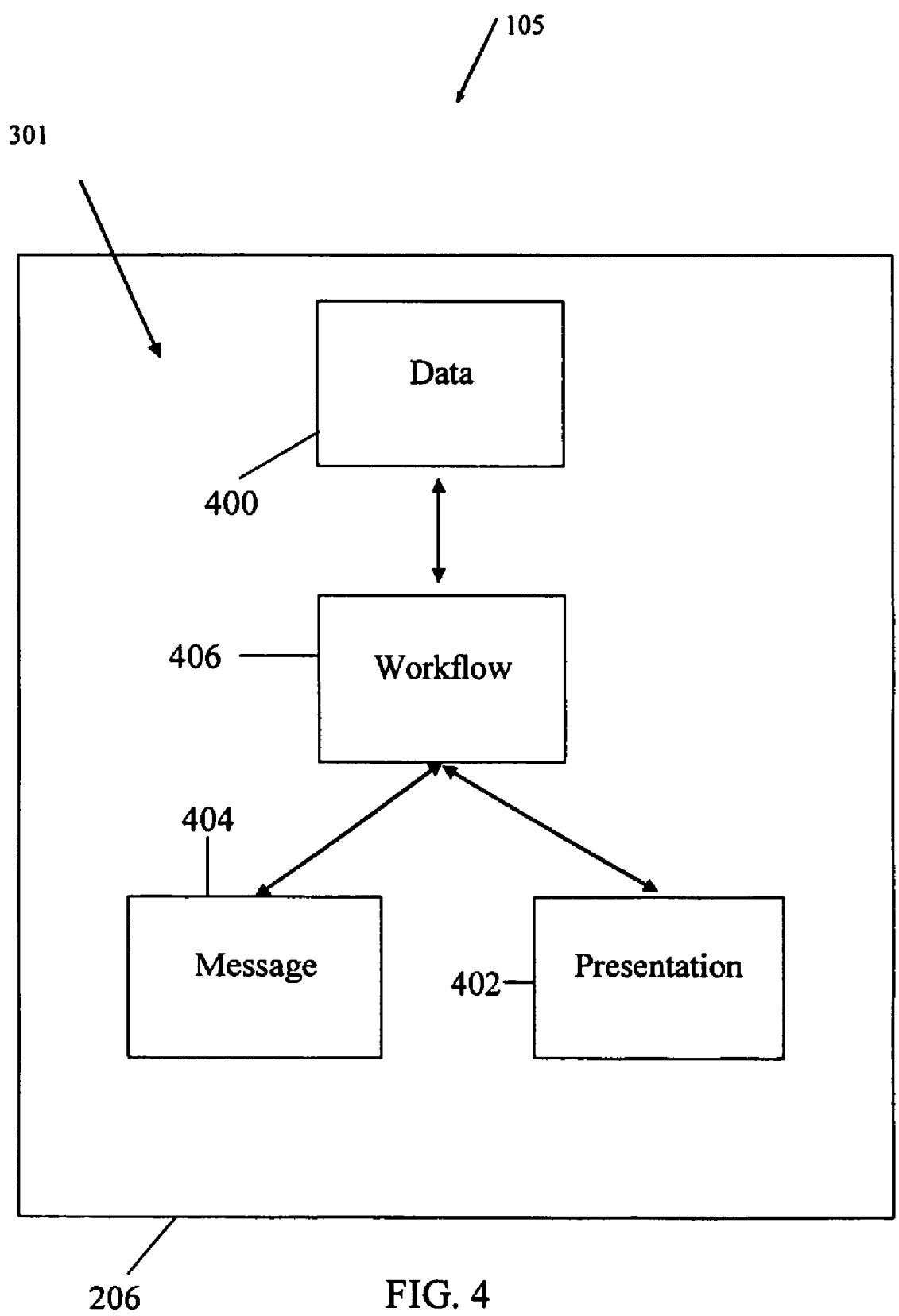
FIG. 4 is a block diagram illustrating example components of the application of FIG. 3.

Referring to FIG. 4, the component applications 105 are software applications which can have artifacts 301 written, for example, in extensible Markup Language (XML) and a subset of ECMAScript. XML and ECMAScript are standards-based languages which allow software developers to develop the component applications 105 in a portable and platform-independent way. A block diagram of the component application 105 comprises the data components 400, the presentation components 402 and the message components 404, which are coordinated by workflow components 406 through interaction with the client runtime environment of the device 100 (see FIG. 1) once provisioned thereon. The structured definition language (e.g. XML) can be used to construct the components 400, 402, 404 as a series of metadata records, which consist of a number of pre-defined elements representing specific attributes of a resource such that each element can have one or more values. Each metadata schema typically has defined characteristics such as, but not limited to: a limited number of elements; a name of each element; and a meaning for each element. Example metadata schemas include, but are not limited to, Dublin Core (DC), Anglo-American Cataloguing Rules (AACR2), United States Government Information Locator Service (GILS), Encoded Archives Description (EAD), Instructional Management Systems (IMS) Global Learning Consortium, and Australian Government Locator Service (AGLS). Encoding syntax allows the metadata of the components 400, 402, 404 to be processed by the runtime environment (see FIG. 1), and encoding schemes include schemes such as, but not limited to, XML, HTML, XHTML, XSML, RDF, Machine Readable Cataloguing (MARC), and Multipurpose Internet Mail Extensions (MIME). The client runtime environment of the device 100 operates on the metadata descriptors of the components 400, 402, and 404 to provision an executable version of the application 105.

Referring again to FIG. 4, the data components 400 define data entities which are used by the component application 105. Data components 400 define what information is required to describe the data entities, and in what format the information is expressed. For example, the data component 400 may define information such as, but not limited to, an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400.

Referring again to FIG. 4, the message components 404 define the format of messages used by the component application 105 to communicate with external systems such as the Web service. For example, one of the message components 404 may describe information such as, but not limited to, a message for placing an order which includes the unique identifier for the order, the status of the order, and notes associated with the order. It is recognised that data definition content of the components can be shared for data 400 and message 404 components that are linked or otherwise contain similar data definitions.

Referring again to FIG. 4, the presentation components 402 define the appearance and behaviour of the component application 105 as it displayed by a user interface of the devices 100. The presentation components 402 can specify GUI screens and controls, and actions to be executed when the user interacts with the component application 105 using the user interface. For example, the presentation components 402 may define screens, labels, edit boxes, buttons and menus, and actions to be taken when the user types in an edit box or pushes a button. It is recognised that data definition content of the components can be shared for data 400 and presentation 402 components that are linked or otherwise contain similar data definitions.

Referring to FIGS. 1 and 4, it is recognized that in the above described client component application 105 definitions hosting model, the presentation components 402 may vary depending on the client platform and environment of the device 100. For example, in some cases Web Service consumers do not require a visual presentation. The application definition of the components 400, 402, 404, 406 of the component application 105 can be hosted in the Web Service repository 114 as a package bundle of platform-neutral data 400, message 404, and workflow 406 component descriptors with a set of platform-specific presentation component 402 descriptors for various predefined client runtime environments. When the discovery or deployment request message for the application 105 is issued, the client type would be specified as a part of this request message. In order not to duplicate data, message, and workflow metadata while packaging component application 105 for different client platforms of the communication devices 100, application definitions can be hosted as a bundle of platform-neutral component definitions linked with different sets of presentation components 402. For those Web Service consumers, the client application 105 would contain selected presentation components 402 linked with the data 400 and message 404 components through the workflow components 406.

Referring again to FIG. 4, the workflow components 406 of the component application 105 define processing that occurs when an action is to be performed, such as an action specified by a presentation component 402 as described above, or an action to be performed when messages arrive from the application gateway 103 (see FIG. 1). Presentation, workflow and message processing are defined by the workflow components 406. The workflow components 406 are written as a series of instructions in a programming language (e.g. object oriented programming language) and/or a scripting language, such as, but not limited to, ECMAScript, and can be (for example) compiled into native code and executed by the runtime environment 206, as described above. An example of the workflow components 406 may be to assign values to data, manipulate screens, or send the message 105. As with presentation components, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are Perl, Rexx, VBScript, JavaScript, and Tcl/Tk. The scripting languages, in general, are instructional languages that are used to manipulate, customize, and automate the facilities of an existing system, such as the devices 100.

Referring to FIG. 4, the application 105 is structured using component architecture such that when the device 100 (see FIG. 1) receives a response message from the application gateway 103 containing message data, the appropriate workflow component 406 interprets the data content of the message according to the appropriate message component 404 definitions. The workflow component 406 then processes the data content and inserts the data into the corresponding data component 400 for subsequent storage in the device 100. Further, if needed, the workflow component 406 also inserts the data into the appropriate presentation component 402 for subsequent display on the display of the device 100. A further example of the component architecture of the applications 105 is for data input by a user of the device 100, such as pushing a button or selecting a menu item. The relevant workflow component 406 interprets the input data according to the appropriate presentation component 404 and creates data entities which are defined by the appropriate data components 400. The workflow component 406 then populates the data components 400 with the input data provided by the user for subsequent storage in the device 100. Further, the workflow component 406 also inserts the input data into the appropriate message component 404 for subsequent sending of the input data as data entities to the data source 106, Web service for example, as defined by the message component 404.

The following example, referring to FIG. 4, shows how a Web Services client application 105 could be expressed using a structured definition language such as, but not limited, to XML, and a platform neutral scripting/programming language such as but not limited to ECMAScript, with defined components conforming with the following Document Type Definition (DTD). While the DTD provides for the scripting (e.g. ECMAScript) within the XML (i.e. the script is embedded within the XML), the DTD may specify that the script may be separate from the XML.

```
<!ELEMENT wcApp (desc?, iconUrl?, res*, wcData*, wcMsg*, style*,
wcScr*, wcFlow)>
<!ATTLIST wcApp
    name CDATA #REQUIRED
    title CDATA #IMPLIED
    vendor CDATA #IMPLIED
    version CDATA #IMPLIED
    transportKey CDATA #IMPLIED
    installNotifURL CDATA #IMPLIED
    registerURL CDATA #IMPLIED
>
<!ELEMENT desc (#PCDATA)>
<!ELEMENT iconUrl (#PCDATA)>
<!ELEMENT res (#PCDATA)>
<!ATTLIST res
    name CDATA #REQUIRED
    url CDATA #REQUIRED
    type (xml | image | sound | any) #REQUIRED
    deferred (true | false) "false"
>
Example Data Component 400
<!ELEMENT wcData (dfield+)>
<!ATTLIST wcData
    name CDATA #REQUIRED
    persisted (true | false) "true"
>
<!ELEMENT dfield (#PCDATA)>
<!ATTLIST dfield
    name CDATA #REQUIRED
    type (String | Number | Boolean | Date | Any) "Any"
    array (true | false) "false"
    cmp (true | false) "false"
    cmpName CDATA #IMPLIED
    key (0 | 1 | 2) "0"
>
Example Message Component 404
<!ELEMENT wcMsg (mfield*)>
<!ATTLIST wcMsg
    name CDATA #REQUIRED
    mapping CDATA #IMPLIED
>
<!ATTLIST wcMsg
    pblock CDATA #IMPLIED
>
<!ELEMENT mfield (#PCDATA)>
<!ATTLIST mfield
    name CDATA #REQUIRED
    type (String | Number | Boolean | Date | Array | XML) #IMPLIED
    mapping CDATA #IMPLIED
>
Example Presentation Components 402
<!ELEMENT wcScr (layout?, menu?, refresh?, event?)>
<!ATTLIST wcScr
    name CDATA #REQUIRED
    title CDATA #IMPLIED
    main (true | false) "false"
    dialog (true | false) "false"
    param CDATA #IMPLIED
>
<!ELEMENT style (font?)>
<!ATTLIST style
    name CDATA #REQUIRED
    bgColor CDATA #IMPLIED
>
<!ELEMENT font EMPTY>
<!ATTLIST font
    name CDATA #REQUIRED
    color CDATA #IMPLIED
    size CDATA #IMPLIED
    bold (true | false) "false"
    italic (true | false) "false"
    underline (true | false) "false"
>
<!ELEMENT refresh (msg+)>
<!ELEMENT msg (#PCDATA)>
<!ELEMENT layout (layout*, label*, separator*, edit*, image*, choice*,
button*, textarea*)>
<!ATTLIST layout
    type (grid | flow | border | vertical) #REQUIRED
    param CDATA #IMPLIED
    placement CDATA #IMPLIED
    style CDATA #IMPLIED
>
<!ELEMENT menu (item*)>
<!ELEMENT item (action, condition?)>
<!ATTLIST item
    name CDATA #REQUIRED
    label CDATA #REQUIRED
    shortcut CDATA #IMPLIED
>
<!ELEMENT action EMPTY>
<!ATTLIST action
    screen CDATA #IMPLIED
    pblock CDATA #IMPLIED
    param CDATA #IMPLIED
    acceptChanges (true | false) "true"
>
<!ELEMENT condition EMPTY>
<!ATTLIST condition
    pblock CDATA #REQUIRED
    param CDATA #IMPLIED
    result (true | false) "true"
>
<!ELEMENT event EMPTY>
<!ATTLIST event
    type (onInit | onClick | onChange | onFocusOut) "onInit"
    pblock CDATA #IMPLIED
    screen CDATA #IMPLIED
    param CDATA #IMPLIED
>
<!ELEMENT separator EMPTY>
<!ELEMENT label (condition?, event?)>
<!ATTLIST label
    name CDATA #REQUIRED
    value CDATA #REQUIRED
    placement CDATA #IMPLIED
    style CDATA #IMPLIED
>
<!ELEMENT edit (condition?, event?)>
<!ATTLIST edit
    name CDATA #REQUIRED
    value CDATA #IMPLIED
    mapping CDATA #IMPLIED
    type (char | number | date | pwd | phone | email) "char"
    readOnly (true | false) "false"
    placement CDATA #IMPLIED
    style CDATA #IMPLIED
>
<!ELEMENT textarea (condition?, event?)>
<!ATTLIST textarea
    name CDATA #REQUIRED
    value CDATA #IMPLIED
    mapping CDATA #IMPLIED
    readOnly (true | false) "false"
```

```
    placement CDATA #IMPLIED
    style CDATA #IMPLIED
>
<!ELEMENT image (condition?, event?)>
<!ATTLIST image
    name CDATA #REQUIRED
    resName CDATA #REQUIRED
    placement CDATA #IMPLIED
>
<!ELEMENT choice (condition?, event?, entry*)>
<!ATTLIST choice
    name CDATA #REQUIRED
    value CDATA #IMPLIED
    mapping CDATA #IMPLIED
    type (singleList | multiList | dropdown | checkbox | radio)
    "singleList"
    readOnly (true | false) "false"
    placement CDATA #IMPLIED
    style CDATA #IMPLIED
>
<!ELEMENT entry (#PCDATA)>
<!ELEMENT button (condition?, event?)>
<!ATTLIST button
    name CDATA #REQUIRED
    label CDATA #REQUIRED
    image (true | false) "false"
    placement CDATA #IMPLIED
    style CDATA #IMPLIED
>
Example Workflow Component 406
<!ELEMENT wcFlow (pblock+)>
<!ELEMENT pblock (#PCDATA)>
<!ATTLIST pblock
    id CDATA #REQUIRED
    param CDATA #IMPLIED
>
```

Figure 5:
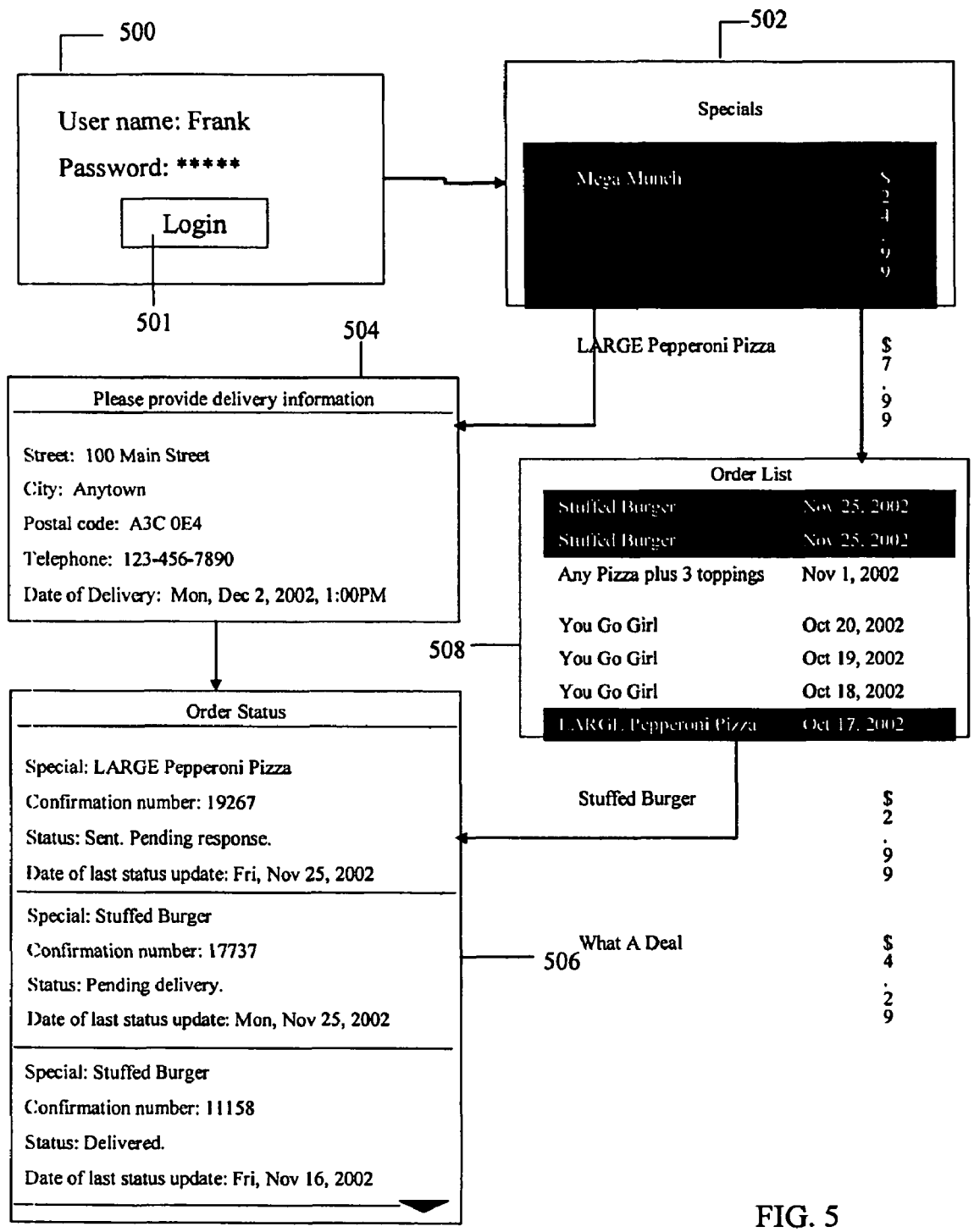
FIG. 5 shows example screens and workflow for a sample component application of FIG. 3.

The example component application program 105 displayed in FIG. 5 is represented in XML and ECMAScript as follows, including data components 400 as "wcData", message components 404 as "wcMsg", presentation components 402 as "wcScr" and workflow components 406 as "wcFlow" for processing the other components 400, 402, 404:

```
<!DOCTYPE wcApp SYSTEM "wcApp.dtd">
<wcApp name="WirelessPizza" title="Wireless Pizza" vendor="ARG"
version="0.9">
    <desc> Order pizza from your wireless device. </desc>
    <iconUrl>http://www.example.com/wirelessPizzaIcon.png</iconUrl>
    <wcData name="User">
        <dfield name="name" type="String" key="1"/>
        <dfield name="passwordHash" type="String"/>
        <dfield name="street" type="String"/>
        <dfield name="city" type="String"/>
        <dfield name="postal" type="String"/>
        <dfield name="phone" type="String"/>
    </wcData>
    <wcData name="OrderStatus">
        <dfield name="confNumber" type="Number" key="1"/>
        <dfield name="status" type="String"/>
        <dfield name="datetime" type="Date"/>
    </wcData>
    <wcData name="Order">
        <dfield name="orderId" type="Number" key="1"/>
        <dfield name="special" type="String"/>
        <dfield name="user" cmp="true" cmpName="User"/>
        <dfield name="datetime" type="Date"/>
        <dfield name="orderStatus" cmp="true" cmpName="OrderStatus"/>
    </wcData>
    <wcData name="Special">
        <dfield name="desc" key="1" type="String"/>
        <dfield name="price" type="Number"/>
    </wcData>
    <wcMsg name="inAddSpecial" mapping="Special">
    </wcMsg>
    <wcMsg name="inRemoveSpecial" pblock="mhRemoveSpecial">
        <mfield name="desc" mapping="Special.desc"/>
    </wcMsg>
    <wcMsg name="inOrderStatus">
        <mfield name="orderId" mapping="Order.orderId"/>
        <mfield name="status" mapping="Order.orderStatus"/>
    </wcMsg>
    <wcMsg name="inUserInfo" mapping="User">
    </wcMsg>
    <wcMsg name="outOrder">
        <mfield name="special" mapping="Order.special"/>
        <mfield name="user" mapping="Order.user"/>
        <mfield name="datetime" mapping="Order.datetime"/>
    </wcMsg>
    <wcScr name="scrSpecials" title="Specials" main="true">
        <layout type="flow">
            <choice name="slSpecials" value="Special[ ].desc + '– $' +
Special[ ].price" type="singleList"/>
        </layout>
        <menu>
            <item name="login" label="Login">
                <action screen="scrLogin"/>
                <condition pblock="chLoggedin" result="false"/>
            </item>
            <item name="order" label="Order">
                <action screen="scrDelivery"
param="Application.authenticatedUser"/>
                <condition pblock="chLoggedin"/>
            </item>
            <item name="viewOrderStatus" label="View Orders Status">
                <action screen="scrOrdersList"/>
                <condition pblock="chLoggedin"/>
            </item>
        </menu>
    </wcScr>
    <wcScr name="scrLogin" dialog="true">
        <layout type="vertical">
            <layout type="flow">
                <label name="lblUserName" value="User Name:"/>
                <edit name="edUserName" type="char"/>
            </layout>
            <layout type="flow">
                <label name="lblPassword" value="Password:"/>
                <edit name="edPassword" type="pwd"/>
            </layout>
            <button name="btnLogin" label="Login">
                <event type="onClick" pblock="ahLogin"
param="edUserName.value"/>
            </button>
        </layout>
    </wcScr>
    <wcScr name="scrDelivery" title="Please provide delivery information"
param="User">
        <layout type="vertical">
            <layout type="flow">
                <label name="lblStreet" value="Street:"/>
                <edit name="street" mapping="User.street" type="char"/>
            </layout>
            <layout type="flow">
                <label name="lblCity" value="City:"/>
                <edit name="city" mapping="User.city" type="char"/>
            </layout>
            <layout type="flow">
                <label name="lblPostalCode" value="Postal code:"/>
                <edit name="postalCode" mapping="User.postal"
type="char"/>
            </layout>
            <layout type="flow">
                <label name="lblPhone" value="Telephone:"/>
                <edit name="phone" mapping="User.phone"
type="phone"/>
            </layout>
            <layout type="flow">
                <label name="lblDate" value="Date of delivery:"/>
                <edit name="date" type="date"/>
            </layout>
        </layout>
```

-continued

```
<menu>
    <item name="sendOrder" label="Send Order">
        <action pblock="ahSendOrder" param="User"/>
    </item>
</menu>
</wcScr>
<wcScr name="scrOrderStatus" title="Order status" param="Order[ ]">
    <layout type="vertical" param="%">
        <layout type="flow">
            <label name="lblSpecialr" value="Special:"/>
            <label name="lblSpecialMapped"
value="@Order[ ].special"/>
        </layout>
        <layout type="flow">
            <label name="lblConfNumber" value="Confirmation
number:"/>
            <label name="lblConfNumberMapped"
value="@Order[ ].orderStatus.confNumber"/>
        </layout>
        <layout type="flow">
            <label name="lblStatus" value="Status:"/>
            <label name="lblStatusMapped"
value="@Order[ ].orderStatus.status"/>
        </layout>
        <layout type="flow">
            <label name="lblConfDate" value="Date of last status
update:"/>
            <label name="lblConfDateMapped"
value="@Order[ ].orderStatus.datetime"/>
        </layout>
        <separator/>
    </layout>
    <menu>
        <item name="continue" label="Continue">
            <action screen="scrSpecials"/>
        </item>
    </menu>
    <refresh>
        <msg> inOrderStatus </msg>
    </refresh>
</wcScr>
<wcScr name="scrOrdersList" title="Previous Orders">
    <layout type="vertical">
        <label name="lblInstructions" value="Select one or more order:"/>
        <choice name="mlOrderList" value="@Order[ ].datetime + ' - ' +
@Order[ ].special" mapping="Order[ ]" type="multiList"/>
    </layout>
    <menu>
        <item name="viewOrder" label="View Order">
            <action screen="scrOrderStatus"
param="mlOrderList.selected"/>
        </item>
    </menu>
</wcScr>
<wcFlow>
    <pblock id="chLoggedin">
        return Application.authenticatedUser != null;
    </pblock>
    <pblock id="ahLogin" param="User.name">
        if(User.passwordHash == Util.md5(scrLogin.edPassword) ) {
            Application.authenticatedUser = User;
            scrLogin.back( );
        } else {
            Dialog.display("Invalid login!");
        }
    </pblock>
    <pblock id="ahSendOrder" param="User">
        Order.orderId = Util.guid( );
        Order.special = scrSpecials.slSpecials.selected;
        Order.user = User;
        Order.datetime = scrDelivery.date;
        OrderStatus.confNumber = Util.guid( );
        OrderStatus.status = "Sent. Pending response.";
        OrderStatus.date = Util.currentDate( );
        Order.orderStatus = OrderStatus;
        outOrder.send( );
        scrOrderStatus.display(Order);
    </pblock>
    <pblock id="mhRemoveSpecial" param="inRemoveSpecial">
        Special.desc = inRemoveSpecial.desc;
        Special.delete( );
    </pblock>
</wcFlow>
</wcApp>
```

As given above, the XML elements define the example component application 105 including a wcApp element, a wcData element, a wcMsg element, a wcSrc element, and a wcFlow element. Referring to FIG. 4, the wcApp element is a top-level element which defines the component application 105. The wcData element defines the example data component 400, which is comprised of a group of named, typed fields. The wcMsg element defines the example message component 404, which similarly defines a group of named, typed fields. The wcSrc element defines the example presentation component 402. The example presentation component 402 is a label, a separator, an image, a button, an edit field, a text area, a single-selection list, a multi-selection list, a drop-list, a checkbox, a radio button, or a screen containing a group of other presentation components 402. The presentation components 402 included in the example component application 105 define a login screen 500, a specials screen 502, a delivery information screen 504, an order list screen 508, and an order status screen 506. These screens would be presented on the user interface of the device 100. The wcFlow element defines the example workflow components 406. The pblock attributes of the XML elements specify a pblock element nested in the wcFlow element. Each pblock element comprises script which defines part of the workflow of the component application 105. The script is written in ECMAScript by way of example only.

In order to define the behaviour of the component application 105, the workflow components 406 use ECMAScript to reference and manipulate the data components 400, the presentation components 402, and the message components 404. Workflow components 406 can also reference external object types, which allow actions to be performed on the components defined in the component application 105. For example, a wcMsg type allows a message defined by a message component 404 to be evaluated to determine whether mandatory fields have been supplied, and to be sent to an external system such as the Web service 106. A wcData type allows the size of collections of data entities defined by data components 400 to be determined, and allows data entities to be deleted. A wcScr type allows a presentation component 402 to be displayed to the user. Similarly, a special dialog external object allows a message to be displayed to the user on the user interface of the device 100. The message components 404 relay the required data for the input and output of the messages of the application 105. The corresponding data components 400 coordinate the storage of the data in memory of the device 100 for subsequent presentation on the user interface by the presentation components 402. The workflow components 406 coordinate the transfer of data between the data 400, presentation 402, and message 404 components. The workflow components 406 are written as a series of instructions such as, but not limited to, ECMAScript, which is described above.

The above described component based application 105 architecture can result in component applications 105 in which the user-interface of the device 100 and the definition of the data are decoupled. This decoupling allows for modification of any component 400, 402, 404, 406 in the component application 105 while facilitating insubstantial changes to other components 400, 402, 404, 406 in the application 105, and thus can facilitate maintenance of the component applications 105, including modification and updating of the component applications 105 on the device 100.

Design Development Tool 116 Architecture

FIG. 6 illustrates the overall design development tool 116 structure for designing component applications 105. The design development tool 116 interface (UI 202 and display 206—see FIG. 2) is primarily a user facing module 601 collection of graphical and text editors 600, viewers 602, dialogs 605 and wizards 604. The large majority of external interactions are accomplished through one or more of these editors 600, with the developer/user, using a system of drag and drop editing and wizard driven elaboration. The secondary and non-user facing system interface is that of the "Backend", whereby the design development tool 116 connects to and digests data source 106 services such as Web Services and SQL Databases. As described above, the design development tool 116 can be built on the ECLIPSE™ platform, whereby the user interface system components can be such as, but not limited to, components of editors 600, viewers 602, dialogs (not shown) and wizards 604, which are plug-in modules 601 that extend ECLIPSE™ classes and utilize the ECLIPSE™ Modelling Framework, for example. As shown, the design development tool 116 communicates with backend data sources 106 and UDDI repositories 114 and registries 112. These external systems 106, 112, 114 may not be part of the design development tool 116 but are shown for completeness.

The design development tool 116 has a UI Layer 606 composed mainly of the editors 600 and viewers 602, which are assisted through the workflow wizards 605. The layer 606 has access to an extensive widget set and graphics library known as the Standard Widget Toolkit (SWT), for ECLIPSE™. The UI layer 606 modules 601 can also make use of a higher-level toolkit called JFace that contains standard viewer classes such as lists, trees and tables and an action framework used to add commands to menus and toolbars. The design development tool 116 can also use a Graphical Editing Framework (GEF) to implement diagramming editors such as the Workflow Editor 702 and the Relationship Editor 704 (see FIG. 7). The UI layer 606 modules 601 can follow the Model-View-Controller design pattern where each module 601 is both a view and a controller. Data models 608, 610 represents the persistent state of the application 105 and are implemented in the data model layer 612 the design development tool 116 architecture. The separation of the layers 606, 612 keeps presentation specific information in the various views and provides for multiple UI modules 601 (e.g. editors 600 and viewers 602) to respond to data model 608, 610 changes. Operation by the developer of the editors 600 and viewers 602 on the display 202 (see FIG. 2) is assisted by the wizards 604 for guiding the development of the application 105.

The design development tool 116 data models 608, 610 can be based on the ECLIPSE™ Modelling Framework (EMF). EMF is a framework and code generation facility. The framework provides model 608, 610 change notification, persistence support and an efficient reflective API for manipulating EMF objects generically. The code generation facility is used to generate the model 608, 610 implementation and create adapters to connect the model layer 612 with the user interface modules 601 of the UI layer 606.

A design development tool 116 service layer 614 provides facilities for the UI layer 606 such as validation 620, localization 624, generation 622, build 626 and deployment 628, further described below. The design development tool 116 can make use of the ECLIPSE™ extension point mechanism to load additional plug-ins for two types of services: backend connectors 616 and device skin managers 618 with associated presentation environments 630 which may include one or more listings of target device appearance definitions for various target devices. The listings are typically references to such definitions (i.e. a listing of available fonts, fonts sizes and effects on the target device) rather than complete specifications for the definitions themselves.

The backend connector 616 defines an ECLIPSE™ extension point to provide for the design development tool 116 to communicate with or otherwise obtain information about different backend data sources 106, in order to obtain the message format of the selected data source 106. The backend connector 616 can be used as an interface to connect to and to investigate backend data source 106 services such as Web Services and SQL Databases. The backend connector 616 facilitates building a suitable application message and data set to permit communication with these services from the application 105 when running on the device. The backend connector 616 can support the access to multiple different types of data sources 106, such as, but not limited to, exposing respective direct communication interfaces through a communication connector based architecture. At runtime the design development tool 116 reads the plug-in registry to add contributed backend extensions to the set of backend connectors 616 such as, but not limited to, connectors for Web Services.

The Backend Connector 616 can be responsible for such as but not limited to: connecting to a selected one (or more) of the backend data sources 106 (e.g. Web Service, Database); providing an interface for accessing the description of the backend data source 106 (e.g. messages, operations, data types); and/or providing for the identification of Notification services (those which push notifications over the network 10 to the device 100—see FIG. 1). The Backend Connector 616 can provide an interface to the backend data source 106 (e.g. a Web service, SQL Database or other) for access of the data source description, and can provide a level of abstraction between implementation specific details of the backend messaging and generic messaging descriptions 302 maintained by the Design Time Data Model 608. For example, the Backend Connector 616 can be used to generate appropriate messaging 404 and data 400 component sets for the application 105, and is used by the Model Validator 620 as part of validation tasks to verify the sanity of existing message mapping 302 relationships in the application 105 under development. For example, the backend connector 616 can be implemented as an interface using an API call as the protocol to access the underlying backend data source 106 (e.g. using a WSDL Interface for Web Services).

The device skin manager 618 defines an ECLIPSE™ extension point, for example, to allow the design development tool 116 to emulate different devices 100 (see FIG. 1), such that the look and feel of different target devices 100 (of the application 105) can be specified. Different skins or presentation environments/formats 630 are "pluggable" into the manager 618 of the design development tool 116, meaning that third parties can implement their own presentation environments 630 by creating new unique SkinIds (an ECLIPSE™ extension point), for example, and implementing an appropriate interface to create instances of the screen elements supported by the runtime environment of the emulated device 100. Alternatively or in addition, skin manager 618 may provide a mapping mechanism for associating target device appearance definitions with development platform appearance definitions to facilitate emulation. Below is a table illustrating a sample association between a representative target device appearance definition and a development platform appearance definition:

| Device Font BBMillbank | Tool Font Times New Roman |
|---|---|
| Font Size | Font Size |
| 8 | 9 |
| 10 | 11 |
| 12 | 14 |
| Font Styles | Font Styles |
| Bold | Bold |
| Italic | Italic |
| Underline | Underline\ |

In this example, device font "BBMillbank" is mapped to tool font "Times New Roman". The font size of 8 in "BBMillbank" is mapped to the size of 9 in "Times New Roman", and size of 10 in "BBMillbank" is mapped to the size of 11 in "Times New Roman", and so on. With respect to font styles (occasionally referred to herein as "effects"), they are directly mapped. The following presents an example of a portion of a screen component definition to specify the appearance of output with reference to target device appearance definitions, namely displaying in accordance with font "BBMILLBANK" in 8 pt. and bold effect:

```
<font>
    <name "BBMILLBANK">
    <size "8">
    <bold "true">
</font>
```

When defining a screen component 402, in one embodiment, a developer may select target device appearance definitions (font, size, effects, etc). via a wizard or list, etc. with which to develop the component 404. The skin manager's mapping mechanism associates the target device appearance definition to a development device appearance definition for use to render the screen component 402 on a viewer or editor (see FIGS. 7 and 8) of the design development tool 116.

Referring to FIG. 6, the UI Layer 606 is comprised of the set of editors 600, viewers 602, and wizards 604 and dialogs 605. The UI Layer 606 uses the Model-View-Controller (MVC) pattern where each UI module 601 is both a View and a Controller. UI Layer modules 601 interact with the data models 608,610 with some related control logic as defined by the MVC pattern. The editors 600 are modules 601 that may not commit model 608,610 changes until the user of the design development tool 116 chooses to "Save" them. An example of an editor 600 is the Script Editor 706 (see FIG. 7), further described below. Viewers 602 are modules 601 that commit their changes to the model 608,612 immediately when the user makes them. An example of a viewer 602 is the Navigator (Project View) 802 (see FIG. 8). Wizards 604 are modules 601 that are step-driven by a series of one or more dialogs 605, wherein each dialog 605 gathers certain information from the user of the design development tool 116 via the user interface 202 (see FIG. 2). No changes are applied to the design time model 608 using the wizards 604 until the user of the design development tool 116 selects a confirmation button like a "Finish". It is recognised in the example plug-in design development tool 116 environment, modules 601 can extend two types of interfaces: ECLIPSE™ extension points and extension point interfaces. Extension points declare a unique package or plug-in already defined in the system as the entry point for functional extension, e.g. an editor 600, wizard 604 or project. Extension point interfaces allow the design development tool 116 to define its own plug-in interfaces, e.g. for skins 618 and backend 616 connectors.

Referring again to FIG. 6, modules 601 (primarily Editors 600 and Viewers 602) in the design development tool 116 are observers of the data models 608, 610 and are used to interact or otherwise test and modify the data models 608, 610 of the application (e.g. components 400, 402, 404, 406—see FIG. 4) in question. When the data model 608, 610 changes, the models 608, 610 are notified and respond by updating the presentation of the application 105. The design development tool 116 uses the ECLIPSE™ Modelling Framework (EMF), for example, to connect the ECLIPSE™ UI framework to the design development tool 116 data model 608, 610, whereby the modules 601 can use the standard ECLIPSE™ interfaces to provide the information to display and edit an object on the display 206 (see FIG. 2). In general, the EMF framework implements these standard interfaces and adapt calls to these interfaces by calling on generated adapters that know how to access the data model 608, 610 residing in memory 210. The design time Data Model 608 is the current version of the application 105 in development and is accessed by the users employing the modules 601 to interact with the associated data of the model 608. Modules 601 can also trigger validation actions on the Design Time Data Model 608. Modules 601 can also cause some or all of the application 105 to be generated from the Design Time Data Model 608 resident in memory 210. In general, the Design Time Data Model 608 accepts a set of commands via the UI 202 (see FIG. 2) that affect the state of the model 608 and in response may generate a set of events. Each module 601 (editor 600 and viewer 602) described includes the set of commands and the events that affect the module 601 and data model 608 pairing.

Figure 8:
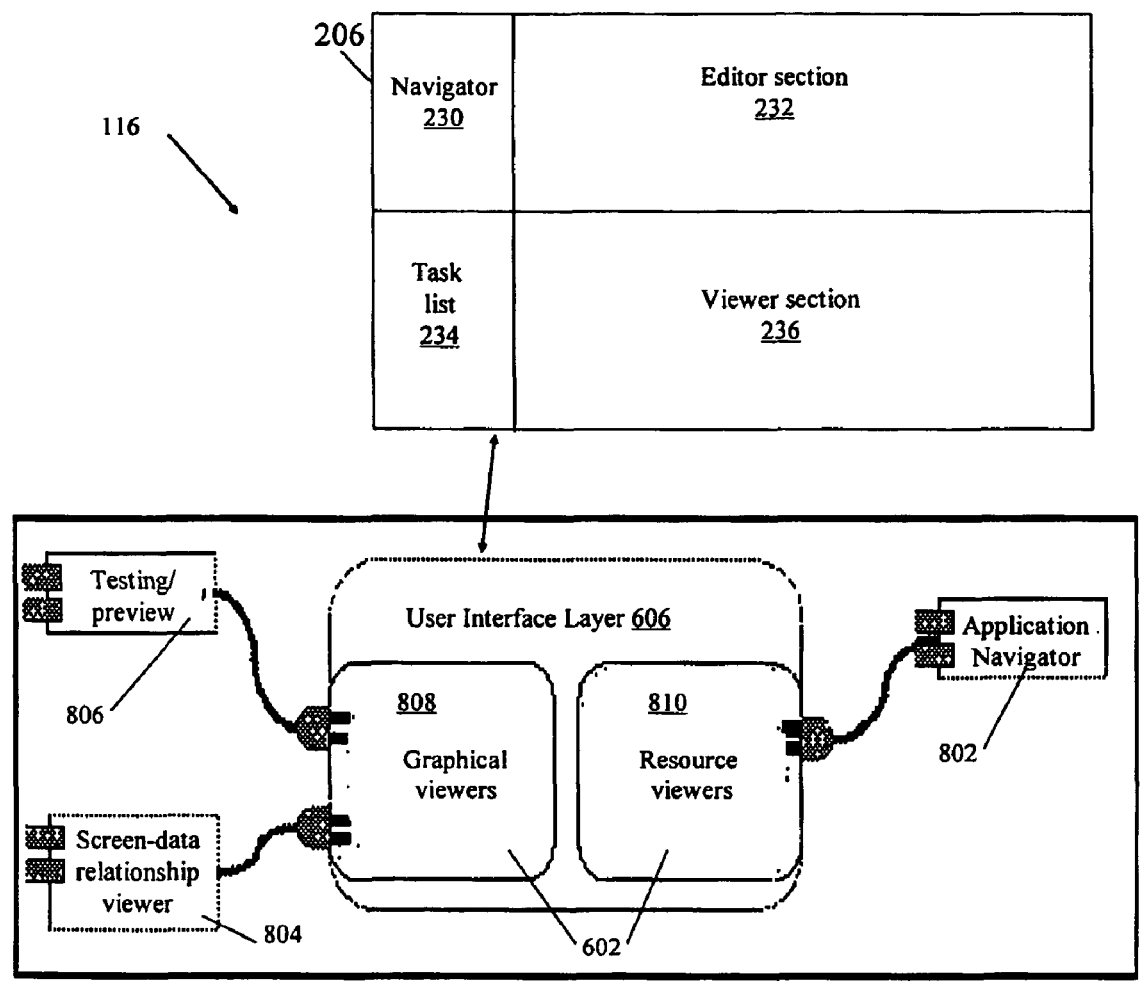
FIG. 8 shows viewers of the tool of FIG. 6.

Referring to FIGS. 6 and 8, the Runtime Data Model 610 represents the state of an emulated application 105 under development by the design development tool 116, using as a basis the contents of the design time data model 608. The runtime data model 610 stores values for the following major items such as but not limited to: Data Components 400 (see FIG. 4); Global Variables; Message Components 404; Resources 304, 306 (see FIG. 3); Screen Components 402 and Styles. The Runtime Data Model 610 collaborates with the Design Time Data Model 608 and a Testing/Preview viewer 806 during emulation of application 105 for testing and preview purposes (for example). The viewer 806 also collaborates with the skin manager 616 for emulating the runtime data model 610 for a specified device 100 type. The Runtime Data Model 610 also notifies, through a bridge 613, the viewer 806 as well as any other modules 601 of the UI layer 606 associated with changes made to the model 610. For example, an API call can be used as a notifier for the associated modules 601 when the state of the model 610 has changed.

Referring to FIGS. 6 and 4, the Design Time Data Model 608 represents the state of an application 105 development project and interacts with the modules 601 of the UI layer 606 by notifying modules 601 when the state of the model 608 has changed as well as saving and loading objects from storage 210. The model's 608 primary responsibility is to define the applications 105 including but not limited to the following exemplary items: Data Component 400 Definitions; Global Variable Definitions; Message Component 404 Definitions; Resource 304, 306 Definitions; Screen Component 402 Definitions; Scripts 406; and style definitions and backend data source mapping 302 descriptors. The Design Time Data Model 608 responds to commands of each editor 600, viewer 602. The Design Time Data Model 608 also fires events to modules 601 in response to changes in the model 608, as well as collaborating/communicating with the other modules 601 (module 601—module 601 interaction) by notifying respective modules 601 when the data model 608 has changed. The data model 608 depends on an interface in order to serialize model 608 content retrieval and storage to and from the memory 210.

The model validation 620 of the service layer 614 provides facilities for the UI layer 606 such as validating the design time data model 608. The Model Validator 620 is used to check that the Design Time Data Model 608 representation of application 105 messages is in line with the backend data source 106 presentation of messaging operations. The Model Validator 620 can be responsible to validate the model 608 representation of the application 105 to be generated, for example such as but not limited to elements of: workflow sanity of the workflow component 406; consistency of parameters and field level mappings of the components 400, 402, 404, 406; screen control mappings and screen refresh messages of the screen components 402; message and/or data duplications inter and intra component 400, 402, 404, 406. Another function of the validation 620 can be to validate the model's 608 representation of backend data source 106 messaging relationships. In order to achieve its responsibilities, the model validator 620 collaborates with the Design Time Data Model 608, an application generator 622 and the backend connector 616. Requests to the Model Validator 620 to validate the model 608 (or a portion of the model 608—on demand) are made through the application generator 622, using the tool user interface 202 for example, via a Validate Model interface (not shown) connecting the generator 622 to the validator 620. The Model Validator 620 in turn utilizes as part of the validation task the Design Time Data Model 608, which contains the application 105 and mapping file Meta model information, as well as the backend connector 616, which supports the interface to the backend data sources 106.

Referring again to FIG. 6, the localization Service 624 has responsibilities such as but not limited to: supporting a build time localization of user visible strings; supporting additional localization settings (e.g. default time & date display format, default number display format, display currency format, etc); and creating the resource bundle files 306 (and resources 304) that can be used during preparation of the deployable application 105 (e.g. an application jar file) by a BuildService 626. For example, the localization service 624 can be implemented as a resource module for collecting resources 304, 306 that are resident in the design time data model 608 for inclusion in the deployable application 105. The JAR file can be a file that contains the class, image, and sound files for the application gathered into a single file and compressed for efficient downloading to the device 100. Transformation rules 631 may be applied, e.g. when creating the jar file, to transform complex XML definitions to a compact form for interpretation by the client device 100. The Localization Service 624 is used by the application Generator 622 to produce the language specific resource bundles 306, for example. The BuildService 626 implements preparation of the resource bundles 306 and packaging the resource bundles 306 with the deployable application 105. The Localization Service 624 interacts (provides an interface) with the tool editors 600 and viewers 602 for setting or otherwise manipulating language strings and locale settings of the application 105.

Referring to FIG. 6, the application Generator 622 can be responsible for, such as but not limited to: generation of the application XML from the components 400, 402, 404; generation of mapping 302 descriptors; optimizing field ordering of the component 400, 402, 404 descriptors; and generation of dependencies and script transformation as desired for storage in the memory 210. The application Generator 622 collaborates with the Design Time Data Model 608 to obtain the content of the developed components 400, 402, 404 comprising the application 105. The application Generator 622 utilizes the Model Validator 620 to check that both the application 105 definitions (of the components 400, 402, 404, 406) and mapping 302 description information are correct. The application Generator 620 then produces the XML code, with inclusions and/or augmentations of the script of the workflow components 406, and mapping 302 file descriptor from relationships held in the Design Time Data Model 608. The application Generator 622 uses the Localization Service 624 to produce the language resource bundles 306, through for example a Resource Bundles interface (not shown). The application Generator 622 generation process is kicked off through a Generate application interface accessed by the developer using the UI 202 of the design development tool 116 (i.e. by user input events such as mouse clicks and/or key presses). It is recognised that the generator 622 can be configured as a collection of modules, such as but not limited to a code module for generating the XML 301 (which may include associated script), and a mappings module for generating the mapping 302 descriptors.

Figure 7:
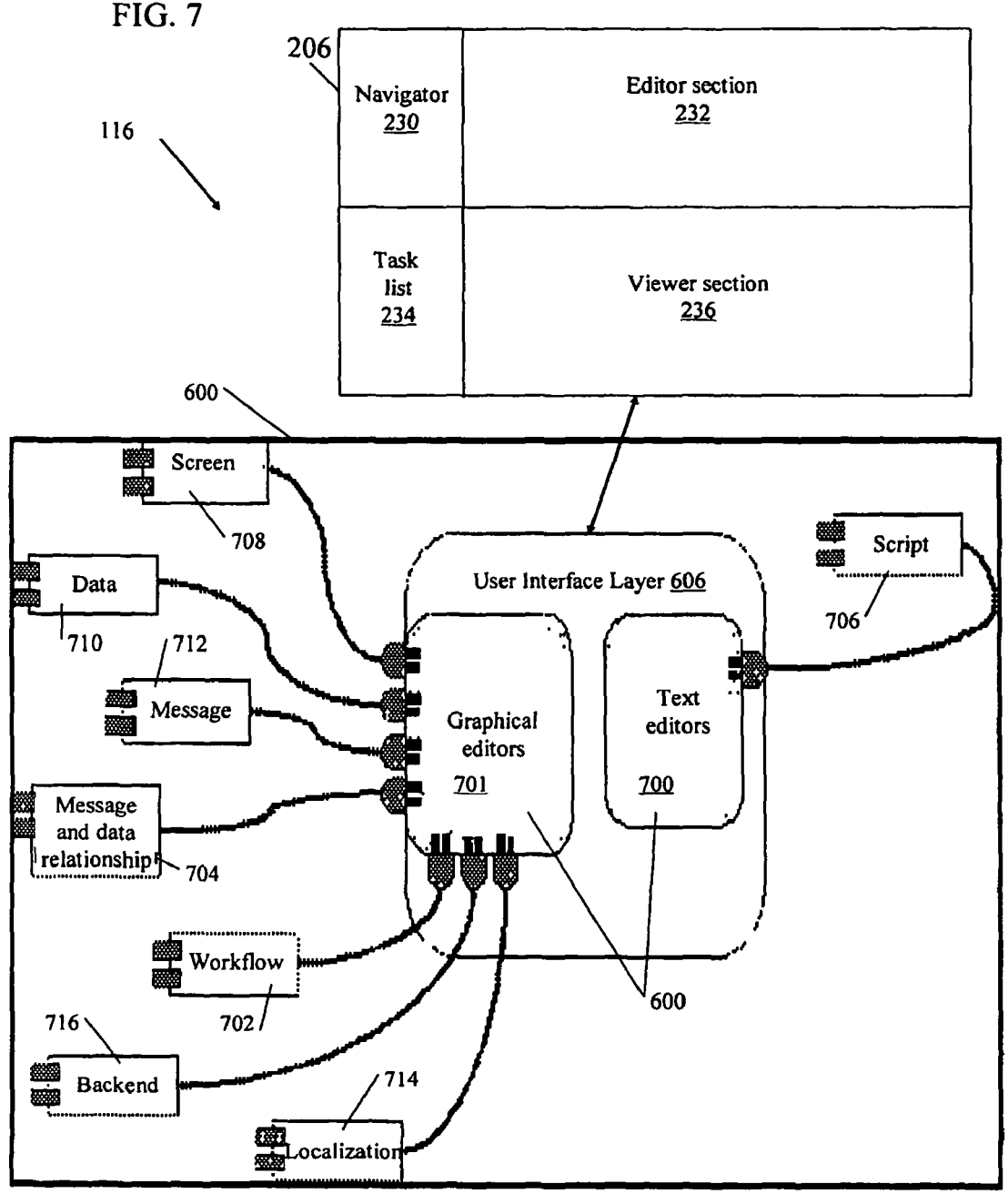
FIG. 7 shows editors of the tool of FIG. 6.

Referring to FIG. 7, the distribution of editors 600 in to ECLIPSE™ plug-ins (by way of example only) is shown. Tool editors 600 fall broadly into two categories such as but not limited to the categories of: Text Editors 700 implement standard line based editing functionality and Graphical Editing Framework (GEF) Editors 701 that provide an edit space in which to draw objects. A GEF Editor 701 in the context of the design development tool 116 can contain a palette and a canvas. The user can drop nodes (entities) from the palette onto the canvas and add connections (relationships) between them, so as to for example define the content and inter-relationships of the XML coding of the components 400, 402, 404, 406 (see FIG. 4). It is recognized that the editors 600 and viewers 602 are used to create and modify definitions contained in the components 400, 402, 404, 406 s well as to create and modify the interdependencies of the definitions between the components (e.g. data-data, data-screen, message-data, screen-data, data-message) as further discussed below. It is recognized that the viewers 602 and editors 600 can be any combination of text based and/or graphical based modules 601, as desired.

Editors 600

For Editor 600 and Data Model 608 decoupling, the editor 600 does not know about the data model 608 directly. The editor 600 relies on a UI provider interface (of ECLIPSE™) to get the information needed to render the object under edit. The editor 600 can be configured with an EMF core object, for example when using the ECLIPSE™ platform that implements a UI provider interface (e.g. ContentProvider, LabelProvider). The EMF provider object adapts UI calls by delegating to a generated adapter (ItemProvider) that knows how to access the data model 608.

In general, the editor 600 creates a command to change the model 608 so that the change can be undone through an undo API (not shown). These changes can be assisted by an appropriate wizard 604 for the development task at hand. The editor 600 can be configured with an EMF core object called an editing domain that maintains a command stack. The editing domain uses the adapter factory to find an adapter that can create the command. The generated adapter class (an ItemProvider) creates the command. The editor 600 executes the command by using the command stack. Further, using the ECLIPSE™ framework as an example, EMF models 608 are change notifiers. Because the ItemProvider is a notification observer it is notified when the data model 608 changes. The ItemProvider in turn notifies the Provider. The Provider tells the Editor 600 and PropertySheet to refresh after a change notification.

The script editor 706 is a constrained text editor for writing the commands (e.g. JavaScript) of the application 105 components, such as but not limited to, the workflow component 406—see FIG. 4. The screen editor 708 is responsible for facilitating the user of the design development tool 116 to define and laying out the structured definition language code (e.g. XML) in the screen components 402 of the application 105 associated with display of data on the device 100. UI controls for inclusion in the screen components 402 can be dropped onto a form canvas (not shown) in the editor section 232 of the display. Control properties including event handlers can also be edited by the screen editor 708.

An example interface of the screen editor 708 extends org.eclipse.ui.editors of the ECLIPSE™ framework using the GEF GraphicalEditor and/or a VE editor. The design development tool 116 coordinates the creation and/or modification of screen definitions in the (e.g. screen 402) components as well as the inter-relation of the created/modified screen definitions (and associated data definitions) affecting other associated components of the application 105. Development platform appearance definitions maybe used to configure screen editor 708 for simulating the appearance of the target device during editing. In accordance with one embodiment of the application, screen components are developed with reference to target device appearance definitions and as various target device appearance definitions are specified, the mapping mechanism maps the choice to an equivalent definition available to the tool computer. As described below, the design time and runtime data models 608, 610 may represent the components using the target device appearance definitions. In an alternative embodiment, the tool's screen editor does not operate transparently (i.e. effectively hiding the use of development platform appearance definitions to render screens in simulation) but offers the developer choices among the development platform appearance definitions to define the screen components 402 in the design time data model 608 and maps such to target device appearance definitions. This mapping of the design time model 608 to the runtime model 610 may be performed when serializing the screen components 402 etc. for deployment to the target device as further described.

The data editor 710 is responsible for facilitating the user of the design development tool 116 to create and modify the structured definition language code (e.g. XML) in the data components 400 (and possibly screen 402 and message 404 components) of the application 105 by providing the developer the ability to edit a Data Component 400 fields and properties. New Data objects can be created from scratch, by prototyping existing Data objects or based on data definition mappings to Message objects in message components 404.

The message editor 712 is responsible for facilitating the user of the design development tool 116 to create and modify the structured definition language code (e.g. XML) in the message components 404 of the application 105. The message designer provides for the developer to create and edit component messages that are sent to and arrive from the backend data sources 106 (in relation to the device 100). These messages can include both request/response pairs as well as subscribe/notify/unsubscribe notification messages. Message definitions can be created by prototyping existing messages or by template-based on back-end services of the data sources 106 such as WSDL and JDBC/SQL.

The workflow editor 702 is responsible for facilitating the user of the design development tool 116 to create and modify the command code (e.g. ECMA Script) in the workflow components 406 of the application 105. The workflow editor 702 defines the screen-to-screen transitions that form the core of the visual part of the component application 105. Screens and transitions between screens due to user/script events are rendered visually.

The message and data editor 704 is responsible for facilitating the user of the design development tool 116 to create and modify the structured definition language code (e.g. XML) in the inter-related message 404 and data 400 components of the application 105. The message/data relationship editor 704 creates and edits relationships between Message Components 404 and Data Components 400. These mappings effect how a Data Component 400 is populated on Message arrival to the device 100 when running the application 105. For example, data object definitions common between data 400 and message 404 components can be such that the data object definitions can be resident in the data component 400, while a only data mapping definition (stating where the data object definition(s) can be found) linking the message component 404 to the data object definition in the data component 400 can be resident in the message component 404, or vice versa. A similar configuration can be employed for data object definitions common between screen 402 and data 400 components, whereby the data object definition is resident in one of the components and the data mapping definition is resident in the other associated component, as further described below in relation to the screen-data relationship viewer 804 (see FIG. 8).

The localization editor 714 provides for the developer to collect all strings that will be visible to the application 105 end-user (of the device 100) and edit them in one place. The editor 714 also provides for the developer to create multiple resource mappings for each string into different languages.

The backend visualizer 716 shows the developer the relationships between Message Components 404 and the backend data sources 106 (Web services, SQL etc.—see FIG. 1) that drive the components 404. The editor 716 also provides for the developer to add new sources 106 to the list of those supported by the application 105 in development. In addition to interaction with the design time data model 608, as is described for other modules 601 using commands and events received, the Backend Visualizer editor 716 collaborates with the Backend Connector 616 (see FIG. 6). The Backend Connector 616 provides for the visualizer to request a Services-Interface from a registry of known service types. A list of Services of this type is returned that can queried by name or by iteration.

Viewers 602

Referring to FIGS. 6 and 8, viewers 602 are modules 601 that commit their changes to the data model 608 as soon as the developer makes them. Referring to FIG. 8, the distribution of viewers 602 in to ECLIPSE™ plug-ins (by way of example only) is shown. Tool viewers 602 fall broadly into two categories such as but not limited to the categories of Resource viewers 810, and Graphical Editing Framework (GEF) viewers 808, which provide an edit space in which to view objects. The user can view nodes (entities) and connections (relationships) between them, so as to for example define the content and inter-relationships of the XML coding of the components 400, 402, 404, and 406 (see FIG. 4). It is recognized that the viewers 602 are used to create and modify definitions contained in the components 400, 402, 404, 406 s well as to create and modify the interdependencies of the definitions between the components (e.g. data-data, data-screen, message-data, screen-data, data-message) as further discussed below. The ECLIPSE™ viewers are modules 601 that commit changes to the data model 608 as soon as the user makes one. The Viewers 602 include: the Navigator 802 which shows a hierarchical view of the application 105 projects in the workspace of the display 206 (see FIG. 2) realized by a tree view (for example); a Testing/Preview viewer 806 that emulates the runtime behaviour of the application 105 and the Screen-Data Relationship viewer 804 that can be a read-only view of the relationships between a screen 402 and the data 400 components that are bound to the respective screens. Each viewer 602 can create an extension point at org.eclipse.ui.views and can implement the IViewPart interface of the ECLIPSE™ platform, usually through a selected default super-class.

The Navigator 802 provides the developer with a hierarchical tree view (for example) of all the project applications 105, folders and files in the workspace of the display 206. The developer can browse and manipulate the objects definitions associated with the selected application 105 project from the Navigator 802.

The Screen/Data viewer 804 provides for the developer to view the relationships between a given screen definition and the Data definition that is bound to it. The interface can be read-only and is constructed from design time data contributed by the associated Screen 402 and Data 400 components. For a read only viewer 804, the viewer 804 does not have any commands that affect the data model 608. The Testing/Preview viewer 806 emulates the runtime behaviour of the application 105 outside of the device 100 (on the designer's computer 201—see FIG. 2). The viewer 806 interacts with: the Skin Manager 618 of the service layer 614 (see FIG. 6) such that a collection of skin plug-ins are managed for the emulated device 100; the Runtime Data Model 610 that models the properties and state of the emulated application 105 and the Design Time Data Model 608 that provides the metadata for the emulated application 105, such as what visual elements exist on a screen and how they are to be laid out. Testing/Preview viewer 806 may be configured via the development platform appearance definitions as determined by the mapping mechanism to provide simulated appearance of the screen components 402.

In use, design development tool 116 may be employed for developing the application 105 having components 400, 402, 404 with descriptors expressed in a structured definition language and component 406 expressed as a series of instructions. It is recognized that individual components 400, 402, 404 and 406 interact for processing messages on the runtime environment of the device 100 that are received from the data source 106 over the network 10. In constructing the application 105, the definitions of the components 400, 402, 404 are developed through interaction with the data model 608, the model 608 for providing a persistent state of the application. The instructions of the second component are developed through interaction with the data model 608. Message mapping information of the data source 106 selected for the application 105 is obtained for assisting in the generation of the definitions based on the mapping information. Once completed, the components 400, 402, 404, 406 are assembled into the application 105.

Figure 9:
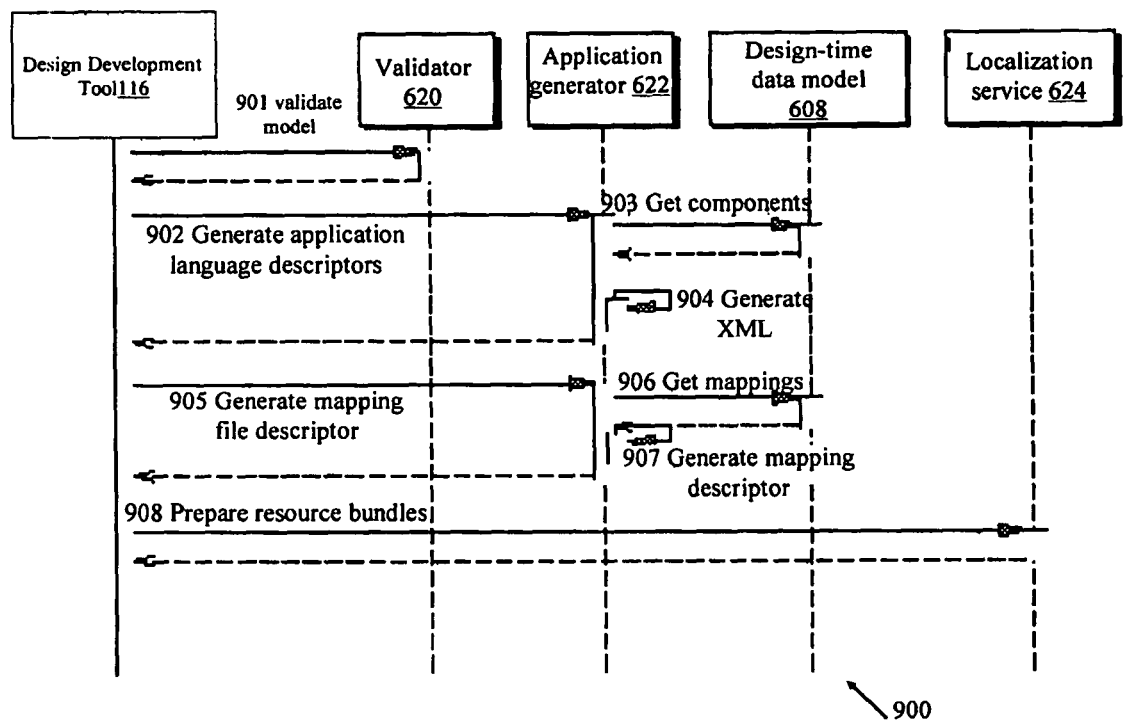
FIG. 9 shows a method of application generation using the tool of FIG. 6.

Referring to FIGS. 6 and 9, a sequence 900 of operations for generating the artifacts 301 for the component application 105, including the generation of mapping 302 files is shown. At step 901 validation of model 608 is performed by model validator 620. At step 902 the definitions (e.g. XML) for the application component 300 (which may include associated script) are generated by the generator 622 by getting (step 903) the components 400, 402, 404, 406 from the data model 608 and generating (step 904 the corresponding XML 300. At step 905 the backend mapping 302 file descriptors are generated by the generator 622 by obtaining 906 the mappings from the data model 608 and then generating 907 the backend mapping descriptors. At step 908 the resource bundles 306 (and resources 304) are prepared, as may be necessary, by the localization service 624 to add to the application 105, as described above with reference to FIG. 3. The generated artifacts 310 of the application 105 are stored in the memory 210.

The EMF-based tool is typically configured to work in a complex XML-Schema dependent XML format. While providing certain advantages as a development language, the EMF generated XML is considered undesirable for use on a resource constrained client device such as a wireless device. The EMF generated XML is unsuitable because it relies on the complex XML-Schema specification which would require a large amount of memory resources to process. Furthermore EMF uses a proprietary path format to address other elements in the XML. The client device would have to understand this path format in order to understand the EMF generated XML. A complementary parser to determine the path would be required on the client device.

In accordance with an embodiment of the present application, the XML generated by EMF is transformed into a simplified DTD-conformant XML suitable for use on a client (e.g. wireless) device 100. In this case the DTD provides for script separate from XML. To illustrate some of the advantages achieved, below are an EMF-generated XML fragment describing a screen component example of an application and a transformed fragment in a simplified format.

| EMF-generated XML fragment |
| --- |
| ```
<screenComponents name="scrLogin" style="Reddy">
    <controls xsi:type="net.rim.wca.tools.studio:RegionDefn" controlName="region1">
        <controls xsi:type="net.rim.wca.tools.studio:LabelDefn" controlName="lblUserName"
            style="Greeny">
            <layoutData xsi:type="net.rim.wca.tools.studio:GridPlacement"/>
            <initialValue
xsi:type="net.rim.wca.tools.studio.designtimemodel.expression:LiteralExpression"
                string="User Name: " literal="User Name: "/>
        </controls>
        <controls xsi:type="net.rim.wca.tools.studio:EditBoxDefn"
controlName="edUserName">
            <layoutData xsi:type="net.rim.wca.tools.studio:GridPlacement" x="1"/>
            <initialValue
``` |

-continued

| EMF-generated XML fragment |
|---|

```
xsi:type="net.rim.wca.tools.studio.designtimemodel.expression:SequenceExpression"
          string="@user.name">
        <expression1
xsi:type="net.rim.wca.tools.studio.designtimemodel.expression:LocalReferenceExpression"
          parameter="//@wicletDefn/@screenComponents.0/@parameters.0"/>
        <expression2
xsi:type="net.rim.wca.tools.studio.designtimemodel.expression:FieldReferenceExpression"
          field="//@wicletDefn/@dataComponents.0/@dataFields.0"/>
      </initialValue>
      <outputMapping xsi:type="net.rim.wca.tools.studio:DataMapping"
component="dummy"/>
      <onInit/>
      <onFocusOut/>
    </controls>
    <controls xsi:type="net.rim.wca.tools.studio:LabelDefn" controlName="lblPassword">
      <layoutData xsi:type="net.rim.wca.tools.studio:GridPlacement" y="1"/>
      <initialValue
xsi:type="net.rim.wca.tools.studio.designtimemodel.expression:LiteralExpression"
          string="Password: " literal="Password: "/>
      <onInit/>
    </controls>
    <controls xsi:type="net.rim.wca.tools.studio:EditBoxDefn"
controlName="edPassword"
          formatType="password">
      <layoutData xsi:type="net.rim.wca.tools.studio:GridPlacement" x="1" y="1"/>
      <initialValue
xsi:type="net.rim.wca.tools.studio.designtimemodel.expression:LiteralExpression"
          string="" literal=""/>
      <onInit/>
      <onFocusOut/>
    </controls>
    <layout xsi:type="net.rim.wca.tools.studio:GridLayout"/>
  </controls>
  <controls xsi:type="net.rim.wca.tools.studio:RegionDefn" controlName="region2">
    <controls xsi:type="net.rim.wca.tools.studio:ButtonDefn" controlName="btnLogin"
          imageResource="music">
      <initialValue
xsi:type="net.rim.wca.tools.studio.designtimemodel.expression:LiteralExpression"
          string="Login" literal="Login"/>
      <imageExpression
xsi:type="net.rim.wca.tools.studio.designtimemodel.expression:LiteralExpression"
          string="" literal=""/>
      <onInit/>
      <onClick/>
    </controls>
    <controls xsi:type="net.rim.wca.tools.studio:ButtonDefn"
controlName="btnRegister">
      <initialValue
xsi:type="net.rim.wca.tools.studio.designtimemodel.expression:LiteralExpression"
          string="Register" literal="Register"/>
      <imageExpression
xsi:type="net.rim.wca.tools.studio.designtimemodel.expression:LiteralExpression"
          string="" literal=""/>
      <onInit/>
      <onClick transitionTo="scrRegisterUser"/>
    </controls>
    <layout xsi:type="net.rim.wca.tools.studio:FlowLayout"/>
  </controls>
  <controls xsi:type="net.rim.wca.tools.studio:ImageDefn" controlName="image1">
    <initialValue
xsi:type="net.rim.wca.tools.studio.designtimemodel.expression:LiteralExpression"
        string="" literal=""/>
    <onInit/>
  </controls>
  <layout xsi:type="net.rim.wca.tools.studio:VerticalLayout"/>
  <title
xsi:type="net.rim.wca.tools.studio.designtimemodel.expression:LiteralExpression"
        string="Login" literal="Login"/>
  <parameters name="user" component="User"/>
  <parameters name="order" component="Order"/>
  <localVariables name="localUser" component="User"/>
  <localVariables name="extendedOrder" component="ExtendedOrder"/>
  <menu>
    <controls xsi:type="net.rim.wca.tools.studio:MenuItemDefn"
controlName="menuItem1">
      <initialValue
```

-continued

EMF-generated XML fragment

```
xsi:type="net.rim.wca.tools.studio.designtimemodel.expression:LiteralExpression"
        string="Configure Activities..." literal="Configure Activities..."/>
      <onClick/>
    </controls>
    <controls xsi:type="net.rim.wca.tools.studio:MenuItemDefn"
controlName="menuItem2">
      <initialValue
xsi:type="net.rim.wca.tools.studio.designtimemodel.expression:LiteralExpression"
        string="Preferences" literal="Preferences"/>
      <onClick transitionTo="scrLogin">
        <parameterReferences
source="//@wicletDefn/@screenComponents.0/@parameters.1"
            dataFields="//@wicletDefn/@dataComponents.1/@dataFields.5"/>
        <parameterReferences
source="//@wicletDefn/@screenComponents.0/@parameters.1"/>
      </onClick>
    </controls>
    <onShow/>
   </menu>
   <onInit/>
   <onShow transitionTo="script_scrLogin_onShow"/>
</screenComponents>
```

In accordance with an embodiment of the application, the first format of the XML in which the definitions of the component are serialized may be transformed into a second, simplified format by applying an appropriate rule from a set of rules. Transformation rules may be defined in a structured definition language such as XSLT in accordance with common specifications for such languages. The transformation may be applied when bundling an application component for eventual deployment to a client device as described further below. XSLT transformation rules may be manual defined. Specific rules for various types of definitions (e.g. message definitions, data definitions, screen definitions, controls, etc.) The rules are developed with a view to the DTD so that the definitions in simplified format adhere thereto. An example rule for screen components is as follows:

Simplified XML fragment

```
<screen name="scrLogin" style="Reddy" layout="vertical" title="Login">
  <param component="User" name="user"/>
  <param component="Order" name="order"/>
  <var component="User" name="localUser"/>
  <var component="ExtendedOrder" name="extendedOrder"/>
  <region name="region1" layout="grid">
    <label name="lblUserName" placement="0 0" inValue="User
Name: " style="Greeny"/>
    <edit name="edUserName" placement="1 0" inValue="@user.name"
mapping="dummy"/>
    <label name="lblPassword" placement="0 1"
inValue="Password: "/>
    <edit type="password" name="edPassword" placement="1 1"/>
  </region>
  <region name="region2" layout="flow">
    <button name="btnLogin" inValue="Login" resource="music"/>
    <button name="btnRegister" inValue="Register">
      <onClick transition="scrRegisterUser"/>
    </button>
  </region>
  <image name="image1"/>
  <menu>
    <menuItem name="menuItem1" inValue="Configure Activities..."/>
    <menuItem name="menuItem2" inValue="Preferences">
      <onClick transition="scrLogin" params="order.user order"/>
    </menuItem>
  </menu>
  <onShow script="script_scrLogin_OnShow"/>
</screen>
```

Sample Rule

```
<xsl:template match="screenComponents">
  <screen name="{@name}">
    <xsl:if test="string(@dialog)">
      <xsl:attribute name="dialog"><xsl:value-of select="@dialog"/>
      </xsl:attribute>
    </xsl:if>
    <xsl:if test="string(@style)">
      <xsl:attribute name="style"><xsl:value-of select="@style"/>
      </xsl:attribute>
    </xsl:if>
    <xsl:if test="string(@backgroundImageResource)">
      <xsl:attribute name="bgImage"><xsl:value-of
select="@backgroundImageResource"/></xsl:attribute>
    </xsl:if>
    <xsl:if test="string(@refreshMessages)">
      <xsl:attribute name="refreshMsg"><xsl:value-of
select="@refreshMessages"/></xsl:attribute>
    </xsl:if>
    <xsl:apply-templates select="title | layout"/>
    <xsl:apply-templates select="parameters | localVariables"/>
    <xsl:apply-templates select="controls | menu | onInit | onShow"/>
  </screen>
</xsl:template>
<xsl:template match="title">
  <xsl:if test="string(@string)">
    <xsl:attribute name="title"><xsl:value-of select="@string"/>
    </xsl:attribute>
  </xsl:if>
</xsl:template>
<xsl:template match="layout">
  <xsl:choose>
    <xsl:when test="@xsi:type='net.rim.wca.tools.studio:FlowLayout'">
      <xsl:attribute name="layout">flow</xsl:attribute>
    </xsl:when>
    <xsl:when test="@xsi:type='net.rim.wca.tools.
    studio:VerticalLayout'">
      <xsl:attribute name="layout">vertical</xsl:attribute>
    </xsl:when>
    <xsl:when test="@xsi:type='net.rim.wca.tools.studio:GridLayout'">
      <xsl:attribute name="layout">grid</xsl:attribute>
    </xsl:when>
  </xsl:choose>
</xsl:template>
<xsl:template match="localVariables">
  <var name="{@name}" component="{@component}"/>
</xsl:template>
```

Referring again to FIGS. 2 and 6, the design development tool 116 can be a utility that runs on a single desktop computer 201. The design development tool 116 provides the main developer capability, which encapsulates the development, preview, validation and generation functions for application 105 development. However, it is recognized that a Build service 626 and/or a security service 631 can be packaged as a separate entity to permit the "home-grown" developer to create applications manually, separate from the other application development of the design development tool 116, and still utilize the preparation and security aspects of the deployable application 105 package (e.g. jar). It is also recognized that a Deployment service 628 can also be packaged separately to permit the "home-grown" developer to generate and deploy the appropriate application descriptor file. Accordingly, the design development tool 116 can make use of external build 626 and deployment 628 service utilities, internal build 626 and deployment 628 services (as shown in FIG. 6), or other configurations thereof as evident to a person skilled in the art.

Referring to FIGS. 3 and 6, the Build Service 626 provides an interface for building a deployable form of the application 105 and is responsible for, such as but not limited to generating a manifest file, and generating the deployable application 105 jar file. The Build Service 626 uses available application XML 300 (which may include associated script), mapping descriptor files 302 and resource bundles 306 (and resources 304) as described above. Build Service 626 can transform the XML used by the application generation environment design development tool 116 to a simplified compact form in accordance with a DTD for interpretation by the client device 100. The availability of these application 105 elements may be done either through the design development tool 116 application Generator 622, or manually in the case of the homegrown development approach using an external Build Service 626. The security service 631 is used to sign the manifest that contains unique information about the application 105. Finally, the Build Service 626 produces the deployable application 105 jar unit, including all artifacts and the signed manifest file. As noted above, the Build Service 626 can be a plug-in to the tool platform or packaged as a separate utility to the design development tool 116 and used by the design development tool 116 for packaging of the deployable application jar file.

Figure 10:
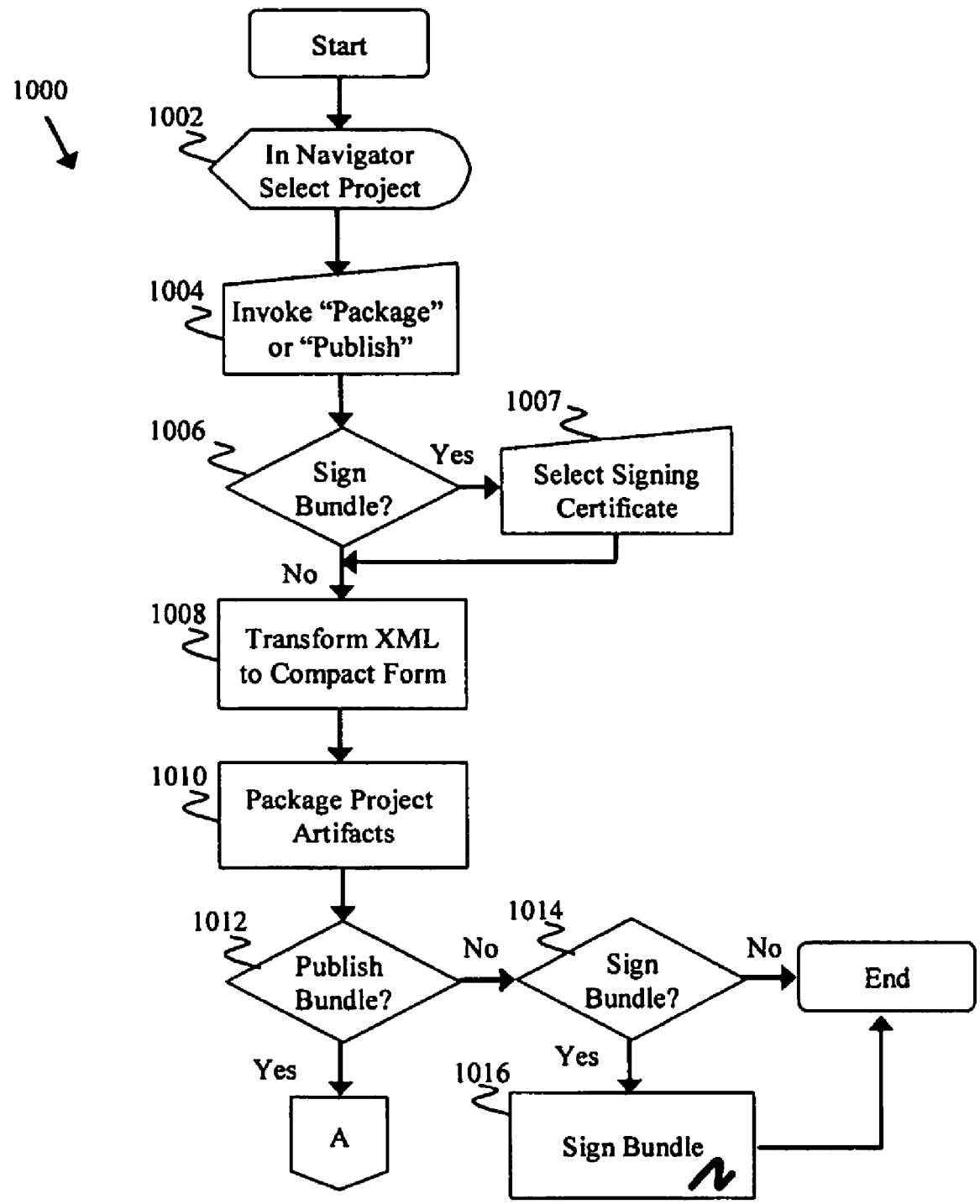
FIG. 10 shows a method of building a deployable application.

Referring to FIGS. 6 and 10, the sequence 1000 of running the build service 626 to generate a deployable application 105 (e.g. as an application jar file) is shown. In the embodiment illustrated build service 626 is configured as a wizard for use within design development tool 116. At step 1002, via a navigator portion 230 of the GUI of toll 116, for example, the developer selects a project. At step 1004 the developer invokes the service 626 and elects between packaging the project bundle or publishing (including packaging). At step 1006 the developer determines whether the bundle will be digitally signed and if so selects a signing certificate.

Operations continue at step 1008 with or without the selected certificate to collect and transform the representation of the objects of the project used by the tool during development phase to a compact form suitable for an intended client as previously described. The service 626 retrieves the mapping file descriptors 302, the resources 304, 306, catalogs and the available application XML 300, (which may include associated script) WSDL(s) and applies one or more rules (e.g. XSLT) from a set of rules 632 to transform the XML to a simplified format. A manifest is typically created for the bundle.

At step 1010, these artifacts are packaged in a bundle (i.e. archive such as a jar). At step 1012, a determination is made whether the package bundle is to be published as previously indicated by the user. If so, operations continue via diagram connector A and with reference to FIG. 11 described below. Otherwise, via No branch to step 1014, a determination is made whether the bundle is to be signed pursuant to the earlier indication, for example. If it is to be signed, at step 1016 the bundle is signed using the selected certificate previously issued by a trusted authority and operations end. The application jar file 105 is thus generated from the gathered artifacts including the transformed XML. The deployable application 105 may then be made available (e.g. stored in the memory 210) for eventual deployment by the deployment service 628 or used locally. It is recognized that applying a digital signature for security purposes is an optional but preferred practise.

Referring to FIG. 6, the security service 631 is employed to sign the manifest jar with a digest produced over the jar file contents and can have two main responsibilities, for example. First and foremost, the security service 631 can be used to generate an IDE (integrated design environment) Tag that can be included in every application 105 jar file. Secondly, the security service 631 can provide a means to initialize a security infrastructure of the design development tool 116. The Build Service 626 interacts with the security service 631 at build time to produce the IDE Tag that can be part of every deployable application 105 jar manifest. The security service 631 can also interact with a build configuration element (not shown—potentially external to the service 631) for permitting configuration of the security service 631, such as but not limited to: initial setup of the signed certificate; for generation of new keys; generation of a key request; and installation of a signed certificate.

Referring again to FIG. 6, the Deployment Service 628 connects to the UDDI repository 114 to install/publish the generated application descriptor file, and can be responsible for generating the deployment descriptor of the application 105. The Deployment Service 628 uses the available application 105 jar file at deployment time. Although the Deployment Service 628 does not install the application 105 jar file, the service 628 introspects the jar file to determine what languages are supported (e.g. represented in the resource bundles 306). This information can be added to the descriptor file.

Figure 11:
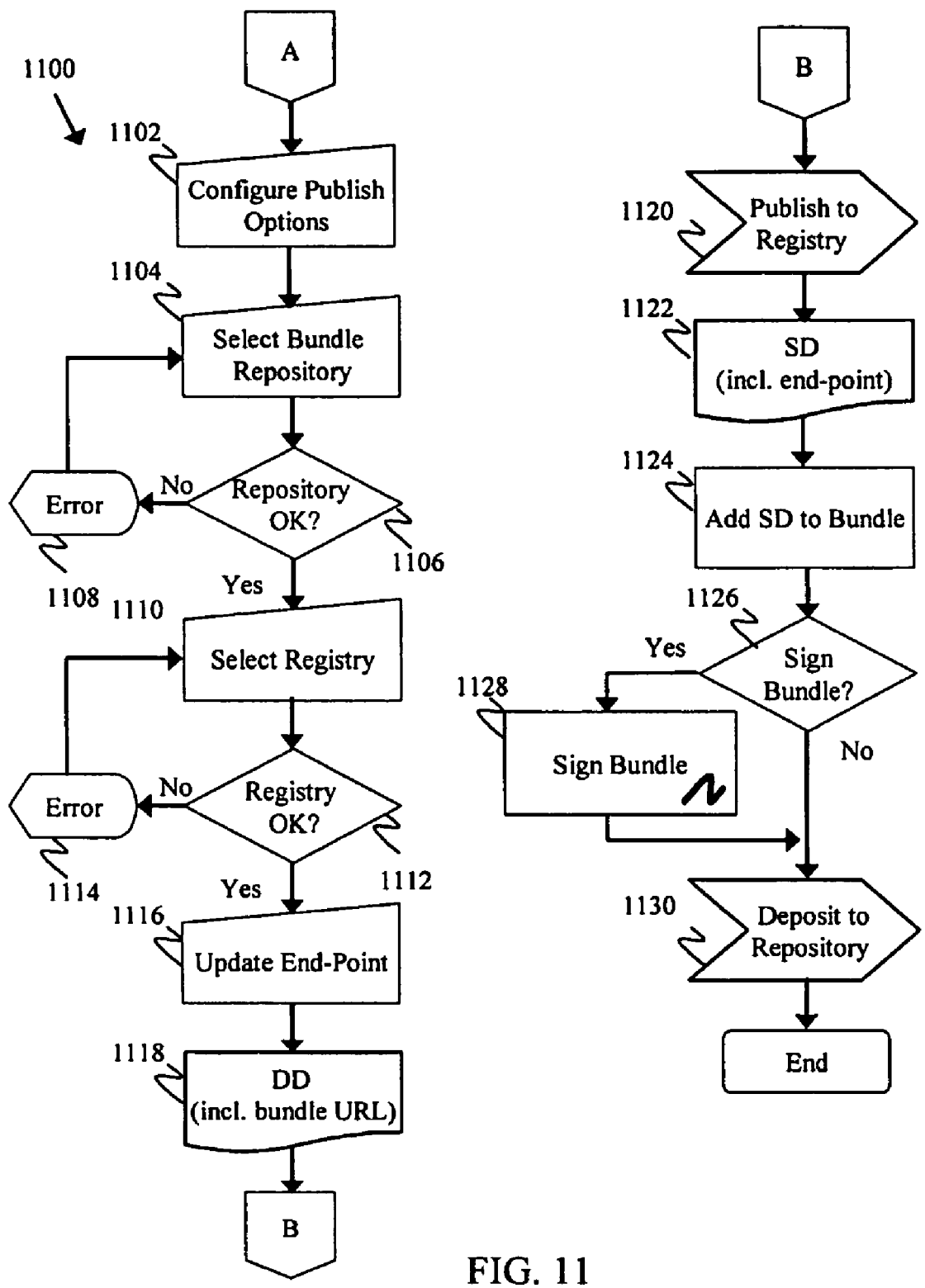
FIG. 11 shows a method of deploying a deployable application.

Referring to FIGS. 6 and 11, a sequence 1100 of operations for deploying the application 105 packaged in accordance with FIG. 10 to a registry 112 (e.g. UDDI-based) and a repository 114 is shown. The repository 114 may comprise a WebDAV (Web-based Distributed Authoring and Versioning) server implementing a set of extension to the HTTP protocol which facilitates users to collaboratively edit manages files in remote servers. Persons of skill in the art will appreciate that publishing may be done immediately following packaging (FIG. 10) or some time thereafter.

At step 1102 various publish options are configured such as through selection and user input using the wizard of design development tool 116. For example, a name and description for the application 105 to be published may be configured by the developer. At step 1104, an intended repository 114 for the bundle is determined (e.g. selected using a discovery service 634) and at step 1106 verified. Verification may include availability, credential validation and uniqueness checks. If an error is determined (step 1108) operations may loop to step 1104. Otherwise at step 1110, a registry 112 for publishing notice of the application is determined (e.g. selected using a discovery service 634) and verified (step 1112) such as with the repository. An error in verification (1114) may send operations back to step 1110. Otherwise operations continue at step 1116 where the target service, data source, etc. endpoint is optionally updated (e.g. to a live production endpoint). A deployment descriptor object for the bundle is configured and generated for publishing to the registry including an appropriate bundle reference (e.g. URL) pointing to the bundle in the intended repository.

At step 1120 operations proceed to publish the deployment descriptor (e.g. through the discovery service 634) to the registry 112. At step 1122, a Service Descriptor is generated for use by the application gateway 103 (e.g. at runtime) from the deployment descriptor, end-point addresses (as updated if applicable), credentials and a list of mapped operations of the end-points. The service descriptor is added to the bundle at 1124 and optionally signed (1126, 1128). The bundle is deposited (e.g. stored in accordance with WebDAV operations) to repository 114.

Below is an example of a service descriptor schema:

```
<?xml version="1.0" encoding="UTF-8"?>
<xsd:schema targetNamespace="http:///net/rim/wica/tools/common/
publish.ecore"
xmlns:wica="http:///net/rim/wica/tools/common/publish.ecore"
xmlns:xmi="http://www.omg.org/XMI"
xmlns:xsd="http://www.w3.org/2001/XMLSchema">
<xsd:import namespace="http://www.omg.org/XMI" schemaLocation=
"XMI.xsd"/>
<xsd:simpleType name="ConnTypes">
<xsd:restriction base="xsd:NCName">
<xsd:enumeration value="soap"/>
<xsd:enumeration value="db"/>
</xsd:restriction>
</xsd:simpleType>
<xsd:complexType name="DependencyItem_">
<xsd:choice maxOccurs="unbounded" minOccurs="0">
<xsd:element ref="xmi:Extension"/>
</xsd:choice>
<xsd:attribute ref="xmi:id"/>
<xsd:attributeGroup ref="xmi:ObjectAttribs"/>
<xsd:attribute name="name" type="xsd:string"/>
<xsd:attribute name="type" type="xsd:int"/>
<xsd:attribute name="version" type="xsd:string"/>
</xsd:complexType>
<xsd:element name="DependencyItem_" type=
"wica:DependencyItem_"/>
<xsd:complexType name="ServiceDescriptor">
<xsd:choice maxOccurs="unbounded" minOccurs="0">
<xsd:element name="keywords" nillable="true" type="xsd:string"/>
<xsd:element name="languages" nillable="true" type="xsd:string"/>
<xsd:element name="dependencies" type="wica:DependencyItem_"/>
<xsd:element name="wsdl_ref" type="wica:WsdlRef"/>
<xsd:element ref="xmi:Extension"/>
</xsd:choice>
<xsd:attribute ref="xmi:id"/>
<xsd:attributeGroup ref="xmi:ObjectAttribs"/>
<xsd:attribute name="bundleURL" type="xsd:string"/>
<xsd:attribute name="dedicatedAGURL" type="xsd:string"/>
<xsd:attribute name="endorsed" type="xsd:boolean"/>
<xsd:attribute name="folder" type="xsd:string"/>
<xsd:attribute name="installNotifyURL" type="xsd:string"/>
<xsd:attribute name="size" type="xsd:string"/>
<xsd:attribute name="type" type="xsd:string"/>
<xsd:attribute name="vendor" type="xsd:string"/>
<xsd:attribute name="wicletDescription" type="xsd:string"/>
<xsd:attribute name="wicletURI" type="xsd:string"/>
<xsd:attribute name="wicletUsername" type="xsd:string"/>
<xsd:attribute name="wicletVersion" type="xsd:string"/>
<xsd:attribute name="username" type="xsd:string"/>
<xsd:attribute name="publisherUrl" type="xsd:string"/>
</xsd:complexType>
<xsd:element name="ServiceDescriptor" type="wica:ServiceDescriptor"/>
<xsd:complexType name="PService">
<xsd:choice maxOccurs="unbounded" minOccurs="0">
<xsd:element name="address" type="wica:PAddr"/>
<xsd:element ref="xmi:Extension"/>
</xsd:choice>
<xsd:attribute ref="xmi:id"/>
<xsd:attributeGroup ref="xmi:ObjectAttribs"/>
<xsd:attribute name="name" type="xsd:string"/>
```

```
<xsd:attribute name="port" type="xsd:string"/>
</xsd:complexType>
<xsd:element name="PService" type="wica:PService"/>
<xsd:complexType name="PAddr">
<xsd:choice maxOccurs="unbounded" minOccurs="0">
<xsd:element ref="xmi:Extension"/>
</xsd:choice>
<xsd:attribute ref="xmi:id"/>
<xsd:attributeGroup ref="xmi:ObjectAttribs"/>
<xsd:attribute name="location" type="xsd:string"/>
</xsd:complexType>
<xsd:element name="PAddr" type="wica:PAddr"/>
<xsd:complexType name="WsdlRef">
<xsd:choice maxOccurs="unbounded" minOccurs="0">
<xsd:element name="connector" type="wica:PConnector"/>
<xsd:element name="service" type="wica:PService"/>
<xsd:element ref="xmi:Extension"/>
</xsd:choice>
<xsd:attribute ref="xmi:id"/>
<xsd:attributeGroup ref="xmi:ObjectAttribs"/>
<xsd:attribute name="name" type="xsd:string"/>
</xsd:complexType>
<xsd:element name="WsdlRef" type="wica:WsdlRef"/>
<xsd:complexType name="PConnector">
<xsd:choice maxOccurs="unbounded" minOccurs="0">
<xsd:element name="property" type="wica:Prop"/>
<xsd:element ref="xmi:Extension"/>
</xsd:choice>
<xsd:attribute ref="xmi:id"/>
<xsd:attributeGroup ref="xmi:ObjectAttribs"/>
<xsd:attribute name="type" type="wica:ConnTypes"/>
<xsd:attribute name="version" type="xsd:string"/>
<xsd:attribute name="user" type="xsd:string"/>
<xsd:attribute name="password" type="xsd:string"/>
</xsd:complexType>
<xsd:element name="PConnector" type="wica:PConnector"/>
<xsd:complexType name="Prop">
<xsd:choice maxOccurs="unbounded" minOccurs="0">
<xsd:element ref="xmi:Extension"/>
</xsd:choice>
<xsd:attribute ref="xmi:id"/>
<xsd:attributeGroup ref="xmi:ObjectAttribs"/>
<xsd:attribute name="key" type="xsd:string"/>
<xsd:attribute name="value" type="xsd:string"/>
</xsd:complexType>
<xsd:element name="Prop" type="wica:Prop"/>
</xsd:schema>
```

Though FIGS. 10 and 11 illustrate and the above description therefore discloses an embodiment of packaging and publishing application components developed using design development tool 116, persons of ordinary skill in the art will appreciate that application components developed and published by others may be used in accordance with the scope of the teachings herein. For example, as an extra function, a developer could browse a public repository, find an interesting application bundle and re-use it in another domain. The bundle may be retrieved for use by design development tool 116, examined, modified and re-signed/bundled as applicable. The end-point may be changed and the bundle and associated descriptors, re-published and re-deposited respectively in a different domain.

Advantageously, the design development tool 116 provides a manner to permit component-based applications to be published in a UDDI registry and packaged in a format that allows easy manipulation and control. Also, design development tool 116 provides the flexibility to persist its object model in a native (first) form while generating a runtime (second compact) form suitable for resource restricted environments such as a wireless device. The bundling permits the WSDL(s) that define Web-services to perform better when cashed locally in gateways when making end-point calls as, physically, the application 'package' including the WSDL(s) is deposited to reside in a controlled repository which is easy to access by the application gateway 103. The application gateway 103, a stateful proxy gateway supporting client devices during runtime, can obtain the published and deposited bundle and provision itself and the client devices accordingly. Signing the published component package provides authentication assurances for publisher and content so that when searching a domain registry for WCA(s) (Wireless Component Application(s)), trusted component applications may be selected. Design development tool 116 also permits publicly available component applications that have been obtained to be (re)packaged, (re)certified and published to run in another domain.

Although the disclosure herein has been drawn to one or more exemplary systems and methods, many variations will be apparent to those knowledgeable in the field, including substitution of other appropriate editors 600 and viewers 602 than those used for exemplary purposes in the description of the patterns 648, and such variations are within the scope of the application. Further, it is recognized that the user interface 202 and the display 206 could be defined together as the user interface of the design development tool 116. Although XML and a subset of ECMAScript are used in the examples provided, other languages and language variants may be used to define component applications. The proposed E4X standard scripting languages could be used in place of ECMAScript, for example. Further, other structured definition languages, than XML described above, can include such as but not limited to Resource Description Framework (RDF), XSLT, and XHTML.

The embodiments of the application described above are intended to be examples only. Those of skill in the art may effect alterations, modifications and variations to the particular embodiments without departing from the scope of the application. The subject matter described herein in the recited claims intends to cover and embrace all suitable changes in technology.

A portion of the disclosure of this patent document contains material which is subject to copyright protection. The copyright owner has no objection to the reproduction by any one of the patent document or patent disclosure, as it appears in the patent and Trademark Office patent file or records, but otherwise reserves all copyrights whatsoever.

The invention claimed is:

1. A system for developing an application for execution on a target device, the system comprising:
 a development platform comprising:
  a processor and a memory storing instructions and data to configure the processor to provide:
   a design development tool, the tool including a user interface for developing a presentation component for output by the target device to a user interface in accordance with a target device appearance definition;
   a plurality of development platform appearance definitions for configuring the appearance of output of the development tool user interface; and
   a mapping mechanism for mapping between the target device appearance definition and a corresponding development platform appearance definition to simulate on the development platform the output of the presentation component by the target device, the mapping mechanism associating a particular target device font with a development platform font, wherein the particular target device font is specified at the development platform, and wherein said development platform font is a different font from said particular target device font.

2. The system of claim 1, wherein the development tool user interface is configured to define the presentation component to include references to the target device appearance definition and the mapping mechanism maps the references to the corresponding development appearance definition to simulate the output of the presentation component.

3. The system of claim 1, wherein the target device appearance definitions and development device appearance definitions further comprise either of font size and font effects.

4. The system of claim 1, wherein the system comprises an integrated development environment tool platform.

5. The system of claim 1, further comprising a serialization module for expressing a definition of the presentation component for deployment to the target device, the definition of the presentation component comprising references to the target device appearance definition.

6. A method for developing an application for execution on a target device, the method comprising:
 defining a presentation component on a development platform, the presentation component for output by the target device to a user interface in accordance with a target device appearance definition;
 mapping between the target device appearance definition and a corresponding development platform appearance definition which approximates the target device appearance definition to simulate on the development platform the output of the presentation component by the target device, the mapping associating a particular target device font with a development platform font wherein the particular target device font is specified at the development platform, and wherein said development platform font is a different font from said particular target device font; and
 simulating an output of the presentation component on the development platform using the development platform appearance definition.

7. The method as claimed in claim 6, further comprising expressing a definition of the presentation component for deployment to the target device, the definition of the presentation component comprising references to the target device appearance definition.

8. The method as claimed in claim 6, wherein the target device comprises a wireless device and the presentation component defines a screen output for the user interface of the wireless device.

9. A machine readable medium comprising program code means executable on a computer having a programmable processor for implementing the method as claimed in claim 6.

10. A system for developing an application for execution on a target device, the system comprising:
 a development platform, comprising:
  a processor and a memory storing instructions and data to configure the processor to provide:
   a design development tool, the tool including a user interface for defining a presentation component expressed using a structured definition language for output by the target device to a user interface in accordance with a target device appearance definition, said defining resulting in a presentation component definition;
   a plurality of development platform appearance definitions for configuring the appearance of output of the development tool user interface; and
   a mapping mechanism for mapping between the target device appearance definition and a corresponding development platform appearance definition to simulate on the development platform the output of the presentation component by the target device, the mapping mechanism associating a target device font with a development platform font wherein a portion of the presentation component definition specifies the appearance of output with reference to the target device font, said presentation component definition specifying by name a particular target device font of said target device, said particular target device font being a different font from said development platform font, and further wherein the presentation component definition is for deployment to the target device.

11. The system of claim 10, wherein the development tool user interface is configured to define the presentation component to include references to the target device appearance definition and the mapping mechanism maps the references to the corresponding development appearance definition to simulate the output of the presentation component.

12. The system of claim 10, wherein the target device appearance definitions and development device appearance definitions further comprise font size or font effects.

13. The system of claim 10, wherein the system comprises an integrated development environment tool platform.

14. The system of claim 10, further comprising a serialization module for expressing a definition of the presentation component for deployment to the target device, the definition of the presentation component comprising references to the target device appearance definition.

* * * * *